US008401832B2

(12) United States Patent
Ghorayeb et al.

(10) Patent No.: US 8,401,832 B2
(45) Date of Patent: Mar. 19, 2013

(54) METHOD AND SYSTEM FOR INTEGRATED RESERVOIR AND SURFACE FACILITY NETWORKS SIMULATIONS

(75) Inventors: Kassem Ghorayeb, Al-Khobar (SA); Jonathan Holmes, Reading (GB); Richard Torrens, Reading (GB); Balraj Grewal, London (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 147 days.

(21) Appl. No.: 10/586,283

(22) PCT Filed: Nov. 23, 2002

(86) PCT No.: PCT/US02/37658
§ 371 (c)(1),
(2), (4) Date: Nov. 6, 2006

(87) PCT Pub. No.: WO2004/049216
PCT Pub. Date: Jun. 10, 2004

(65) Prior Publication Data
US 2007/0112547 A1 May 17, 2007

(51) Int. Cl.
*G06G 7/50* (2006.01)
(52) U.S. Cl. ............................................. 703/9; 703/10
(58) Field of Classification Search .................. 703/9, 10
See application file for complete search history.

(56) References Cited

U.S. PATENT DOCUMENTS

| | | | |
|---|---|---|---|
| 5,710,726 A | 1/1998 | Rowney | |
| 6,108,608 A * | 8/2000 | Watts, III | 702/30 |
| 6,662,146 B1 | 12/2003 | Watts | |
| 6,928,399 B1 | 8/2005 | Watts | |
| 7,006,959 B1 | 2/2006 | Huh | |
| 7,379,853 B2 | 5/2008 | Middya | |
| 2002/0013687 A1 | 1/2002 | Ortoleva | |
| 2002/0016703 A1 | 2/2002 | Barroux | |
| 2005/0065759 A1 | 3/2005 | Barroux | |

FOREIGN PATENT DOCUMENTS

| | | |
|---|---|---|
| CA | 2286173 A1 | 8/1999 |
| CA | 2506883 | 6/2004 |
| CA | 2353954 | 7/2007 |

(Continued)

OTHER PUBLICATIONS

Briens et al. "Application of Sequential Staging of Tasks to Petroleum Reservoir Modeling". IEEE 1990.*

(Continued)

*Primary Examiner* — Saif Alhija
(74) *Attorney, Agent, or Firm* — Colin L. Wier

(57) ABSTRACT

A method includes initiating a first reservoir simulation on a first simulator for a first set of physical parameters of a first reservoir. The first reservoir simulator uses a first set of components for a compositional reservoir model. A second reservoir simulation is initiated on a second simulator. A network simulation is initiated on a network simulator to model a network for coupling the first reservoir and the second reservoir to a surface facility. The network simulator uses a second set of components for a compositional network model. The method further includes translating each of a first hydrocarbon fluid stream of the first reservoir simulator and a second hydrocarbon fluid stream of the second reservoir simulator to a common fluid model. Further, network balancing is initiated among the simulators at a corresponding point in each controller time step.

19 Claims, 12 Drawing Sheets

FOREIGN PATENT DOCUMENTS

| WO | 0140937 A1 | 6/2001 |
|---|---|---|
| WO | 02063130 A1 | 8/2002 |
| WO | 03/006285 | 1/2003 |
| WO | 2004049216 A1 | 6/2004 |

OTHER PUBLICATIONS

Haugen et al. "Simulation of Independent Reservoirs Coupled by Global Production and Injection Constraints" 1995 Society of Petroleum Engineers. Abstract.*

Scott et al. "Application of Parallel (MIMD) Computers to Reservoir Simulation", SPE 16020, 1987.*

Ghorayeb, "A general purpose controller for coupling multiple reservoir simulations and surface facility networks", SPE Reservoir Symposium, Houston, Texas USA, Feb. 3-5, 2003, SPE 79702.

Weisenborn, et al., "Compositional integrated sub-surface-surface-modeling", presented at SPE European Petroleum Conference, Paris, France, Oct. 24-25, 2000, SPE 65158.

Tingas, et al., "Integrated reservoir and surface network simulation in reservoir management of Southern North Sea Gas Reservoirs", 1998 SPE European Petroleum Conference, The Hague, Netherlands, Oct. 20-22, 1998, SPE 50635.

Leibovici, et al., "A consistent procedure for pseudo-component delumping" Fluid Phase Equilibria, Elsevier Scientific Publishing Company, Amsterdam, NL, vol. 117, 1996, pp. 225-232, XP002083980.

Trick, "A different approach to coupling a reservoir simulator with a surface facilities model", 1995 SPE Gas Technology Symposium, Calgary, Alberta, Canada, Mar. 15-18, 1998, SPE 40001.

Haugen, et al., "Simulation of independent reservoirs coupled by global production and injection constraints", SPE Reservoir Simulation Symposium, San Antonio, Texas, USA, Feb. 12, 1995, SPE 29106.

Baroux, et al., "Linking reservoir and surface simulators: how to improve the coupled solutions", SPE European Petroleum Conferencer, Paris, France, Oct. 24-25, 2000, SPE 65159.

* cited by examiner

| COMPONENTS/ PSEUDO-COMPONENTS | MOLE FRACTION |
|---|---|
| $N_2$ | 0.0069 |
| $CO_2$ | 0.0069 |
| $C_1$ | 0.5280 |
| $C_2-C_3$ | 0.1515 |
| $C_4-C_6$ | 0.0703 |
| $C_8$ | 0.0867 |
| HC13 | 0.0529 |
| HC18 | 0.0340 |
| HC26 | 0.0238 |
| HC43 | 0.0145 |

METHOD AND SYSTEM FOR INTEGRATED RESERVOIR AND SURFACE FACILITY NETWORKS SIMULATIONS

BACKGROUND OF THE INVENTION

1. Field of the Invention

The recently published literature shows the need for a comprehensive integrated modeling solution for coupling multiple reservoir simulations and surface facility networks.[1-8] This need is emphasized by recent deepwater oil and gas field development where, typically, wells from different reservoirs flow through pipelines to a shared surface facility platform before being transported by a pipeline to the sale point. Surface/subsurface coupling involves several issues including:

- The coupling mode of the surface and subsurface models: explicit or implicit. This has previously been described for the case of a single reservoir simulation coupled to a surface network model.[9,10]
- The application of global production and injection/re-injection constraints to a coupled system of multiple reservoirs.[11]
- The use of different PVT models (black oil models and compositional models having different sets of pseudo-components) in the coupled reservoirs and the surface network model.[4,5]
- Time step synchronisation and coupling scheme in the case of multiple coupled reservoirs.[11]
- The surface/subsurface coupling location: whether to couple at the well head or at the reservoir level (with various degrees of overlapping).[12]

2. Description of the Related Art

Litvak and Darlow[7] and Litvak and Wang[14] used an implicit compositional reservoir model/surface network coupling. In this mode, the equations describing multiphase fluid flow in the reservoir, the well inflow relationship, the well. tubing model and the surface facility model are solved simultaneously. Treating the wellheads and nodes of the surface pipelines equivalently to additional grid blocks of the reservoir model, the complete system of equations is linearized and the resulting linear system is solved to obtain the updated values of the solution variables at each Newton iteration.

Although an implicit: surface/subsurface coupling might provide better convergence when solving the non-linear system of equations, it suffers from a lack of flexibility when it comes to software choice.[12] Furthermore, coupling several reservoir models to a shared surface facility is not feasible implicitly without amalgamating these models into a single grid (with a large number of grid blocks), which would be inefficient and difficult to maintain.[11,13]

An alternative to implicit surface/subsurface coupling is an iteratively lagged scheme. At each Newton iteration of the reservoir model, the surface network is balanced with the well/reservoir model using the latest iterate of the reservoir solution. When a balanced solution has been obtained, it is applied as a control target to the wells in the reservoir model while the reservoir simulator performs its next Newton iteration of the solution. The control target may typically be the tubing head pressure (THP), the bottom hole pressure (BHP) or the flow rate of each well obtained from the balanced surface/subsurface solution.

The advantages of an iteratively lagged coupling scheme are its simplicity and flexibility. A fully implicit coupling scheme requires additional derivatives to be computed reflecting the coupling of the wells through the network, and these must be accommodated in the Jacobian matrix of the reservoir simulator. An iteratively lagged scheme omits these derivatives, reducing the data communication between the surface and subsurface models to the instantaneous conditions at the coupling points (e.g. well rates, pressure, PI). The scheme is therefore an appropriate choice for coupling independent surface and subsurface simulators; this solution can offer more flexibility in the choice of software, provided that each simulator has a compatible open interface through which they can exchange data.[12]

The main disadvantage of an iteratively lagged scheme relative to a fully implicit scheme that includes all the derivatives is that the reservoir simulator may require more Newton iterations to converge its time step. Without the extra derivatives from the surface network model, the Jacobian matrix in the reservoir model does not take into account the response of the network to the changes in the well and reservoir solution over each Newton iteration. In some circumstances omitting these derivatives may compromise the convergence of the time step. The remedy is to balance the network with the well/reservoir model only in the first few Newton iterations of each time step (typically 2 or 3). If the reservoir simulator requires more Newton iterations than this to converge the time step, the well control targets are kept constant for the remainder of the time step calculation. This scheme has been used successfully for many years, for group control applications and for coupling integrated network models built into the reservoir simulator.

The iteratively lagged coupling scheme; however, is not well suited for cases where multiple reservoir models are coupled to the surface model. In general, the reservoir models will choose different time step sizes and will solve their time steps with different numbers of Newton iterations. An iteratively lagged coupling scheme would require the reservoir models to be tightly synchronised to take the same time steps (the minimum of the time step sizes of all the models), which may slow the simulation process considerably. An alternative coupling scheme for these cases is an explicit ('loose') coupling in which the reservoir models are synchronized at specific times chosen by the controller (the 'controller time step') and the network balancing is performed at the start of each controller time step. The reservoir models are then allowed to advance independently to the start of the next controller time step, taking as many of their own time steps as they deem necessary, while keeping their well control targets constant at the value set by the latest balanced network solution. This is less accurate than the iteratively lagged scheme and may result in a degree of inconsistency between the reservoir and network solutions. Issues and remedies related to explicit coupling are discussed later in this paper.

Several integrated modeling solutions have been reported that enable multiple reservoirs to be coupled to shared surface facilities.[1,2,4,11] The most functionally advanced among these models is the Hydrocarbon Field Planning Tool (BFPT)[4] in which multiple reservoir models (black oil or compositional) are coupled to a shared surface network. Surface/subsurface coupling takes place through an open interface and provides balanced pressures at the well tubing heads. Coupling a black oil reservoir model to a compositional surface network model is also allowed, using an advanced black oil delumping scheme.[5] However, the referenced material regarding HFPT does not describe the technical details involved in a multiple reservoir/network coupling scheme.

SUMMARY OF THE INVENTION

In this paper we describe a general purpose controller for coupling multiple reservoir simulations and surface facility networks. It communicates with a selection of reservoir and surface network simulators through an open interface. The reservoir simulators are ECLIPSE 100 and ECLIPSE 300, while the surface network simulators are all PIPESIM and an in-house prototype. We begin by describing the coupling scheme for a single reservoir with a surface network. We then discuss the coupling issues for multiple reservoirs (with or without a surface network). The compositional aspects involved when the coupled system includes different fluid models are then discussed. Some example applications are described to illustrate the capabilities of the system.

DETAILED DESCRIPTION

Coupling a Single Reservoir to an External Network

Here the controller's purpose is to keep an external network model balanced with a single reservoir simulation as the reservoir conditions evolve. The controller can also apply rate constraints, which it may either pass to the reservoir simulator to handle through is standard group control procedures, or pass to the network model to be applied by adjusting the pressure drop across a choke.

Figure 1:
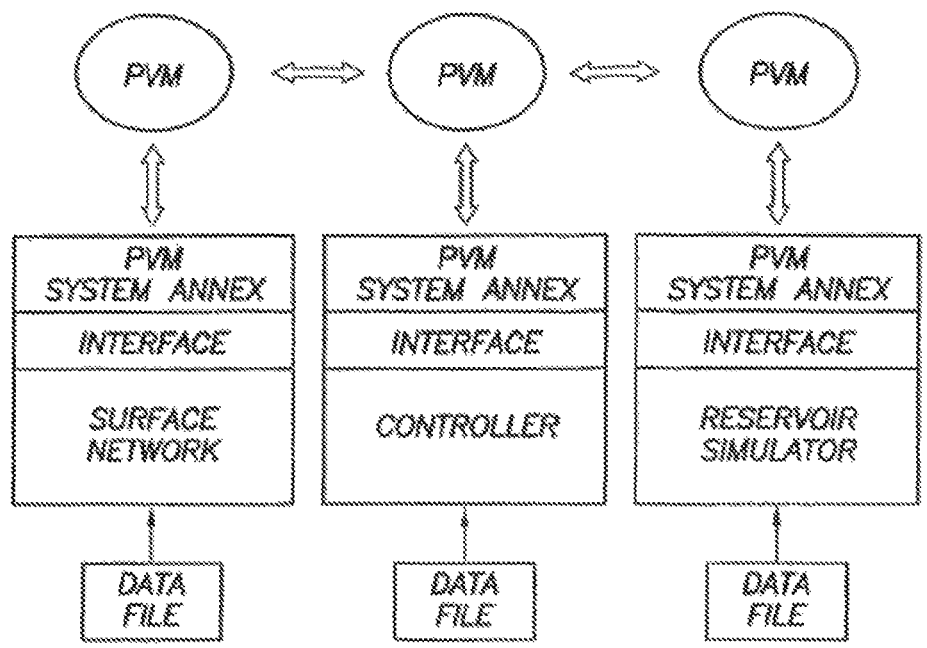
FIG. 1 illustrates an exemplary system architecture of the present invention.

The system architecture is shown in FIG. 1. The controller communicates with the network and reservoir simulators through an open interface, which enables the applications to exchange data via message packets. The interface constructs the message packets and passes them to a lower level systems annex, which contains PVM calls to pass them to the PVM daemon running on the system. The applications may be run on different computers; PVM handles the communications between the host computers. It should be noted that the architecture makes it a relatively simple task to change from PVM to another communications protocol such as MPI.

The Open Interface

The open interface to the ECLIPSE 100 black oil reservoir simulator has been available for a number of years, and has already been used to couple some surface network models to the simulator.[8,9] It has since been extended and ported to the ECLIPSE 300 compositional reservoir simulator. We shall summarize its current features here before describing in detail the coupling scheme that we employ.

When the open interface is enabled, the simulator can be instructed to pause in each of three event loops to wait for commands communicated through the interface. The first event loop is at the start of each time step. The second event loop is at the start of each Newton iteration of the time step; this is primarily intended for iteratively lagged coupling schemes. The third event loop is at the end of each time step; this allows the final well rates etc. to be interrogated before the next time step begins (or the run finishes).

In each of these event loops the controller can engage in a defined dialog with the simulator. The elements of the dialog may be classed into three categories:

Executive commands. These instruct the simulator to perform a particular action. Examples include
  Solve the production/injection system with the current constraints
  Perform the next Newton iteration of the time step
  Complete the solution of the time step (talking as many further Newton iterations as necessary)
  Write a report
  End the run.

Set commands. These can set well and group constraints, wellstream compositions (for injectors) and reporting flags (dictating what is written to the report files). In the event loop at the start of the time step, an upper limit on the time step size can also be set. (The actual time step size is decided before the Newton event loop is entered.)

Query commands. These can inquire well and group quantities (flow rates, BBP, composition etc.), the time, date and time step length, the time to the next report and the state of convergence of the time step.

A similar interface has been implemented in both network simulators, having the same categories of dialog elements:
  Executive commands. These include a command to solve the network with the current set of constraints and source/sink conditions.
  Set commands. These can set branch properties, rate or pressure constraints at nodes, and define the source /sink conditions.
  Query commands. These can inquire the flows in the branches and the pressure at the nodes.

The Coupling Scheme

The coupling points between the network and reservoir models may either be individual well tubing heads or well-groups; the latter correspond to manifolds to which several wells may connect sharing the same tubing head conditions. The reservoir simulator determines the pressure drop from the well bottom hole to the tubing head from pre-calculated vertical flow performance (VFP) tables. The choice of coupling points may be extended in the future to include the well bottom hole, although it would increase the computation time if the network simulator has to perform wellbore pressure traverses to the bottom hole.

When the network couples to a single reservoir model, a 'tight' iteratively lagged coupling scheme can be applied.

This balances the network with the well/reservoir system at each Newton iteration of the reservoir simulator's time step calculation. As explained earlier, if the time step requires more than a certain number (NUPCOL) of iterations to converge, the network is not re-balanced during the remaining iterations of the time step and the well-control targets are left unchanged.

Other options for the frequency of network-reservoir balancing are to balance at the start of each time step (explicit coupling) or at specified time intervals ('loose' coupling).

While these options would require less overall computation time in the network model, the accuracy of the coupled solution would be poorer. At the end of the time step the network is out of balance with the reservoir conditions, depending on how much. the reservoir conditions have changed since the last network-reservoir balancing. With a 'tight' iteratively lagged coupling scheme, the end-of-timestep balance error reflects only the changes in reservoir conditions that occur after the NUPCOL'th Newton iteration. But for an explicit scheme it reflects the changes in reservoir conditions that occur over the whole time step (or perhaps several time steps in a 'loose' coupling scheme). To solve the coupled system to a given accuracy in an explicit scheme it may be necessary to restrict the time step size, which would incur additional work for the reservoir simulator. In general, the optimum frequency for network balancing would depend on how the computational cost of a network-reservoir balancing calculation compares with that of a reservoir simulation time step.

When a balanced solution has been obtained for the network-reservoir system, it is applied as a control target for the wells while the simulator performs the next Newton iteration or solves the time step. The control target could be the wells' THP, BHP or flow rate. The choice can be important, particularly in explicit or loose coupling schemes when the reservoir conditions may change significantly between successive balancing calculations. In a reservoir with declining pressure, fixing the BHP will give a pessimistic result for production wells. Indeed, if the subsequent pressure decline before the next balancing calculation is significant compared to the pressure drawdown between the reservoir grid blocks and the well completion, the resulting error in the flow rate will be large. Setting the flow rate as the control target, on the other hand, will not give such a catastrophic error for low-drawdown wells, but it will give a somewhat optimistic result instead. Setting the THP as the control target is the best compromise, if the reservoir simulator can solve the wells fully implicitly under this control mode (usually by interpolating VFP tables). The error is smaller because the well bore response is included in the reservoir solution.

Barroux et al.[12] point out that it is still possible to set the THP as the control target in the simulator even if the coupling point is the well bottom hole, provided that the network and reservoir simulators both use the same method for calculating pressure losses in the well bore. However, in a tight coupling scheme the difference between setting the THP or the rate as the control target will not be such a significant issue as it is in an explicit or loose coupling scheme.

Balancing the Network/Reservoir System

The balancing process managed by the controller consists of the exchange of information between the wells or well-groups in the reservoir simulation model and the source/sink nodes in the network model. There are several methods of performing this calculation. Here we describe a suitable method for cases where the coupling point is the tubing head, and the network simulator can accept source node boundary conditions of either defined flow rates or a defined linear inflow relation.

Figure 2:
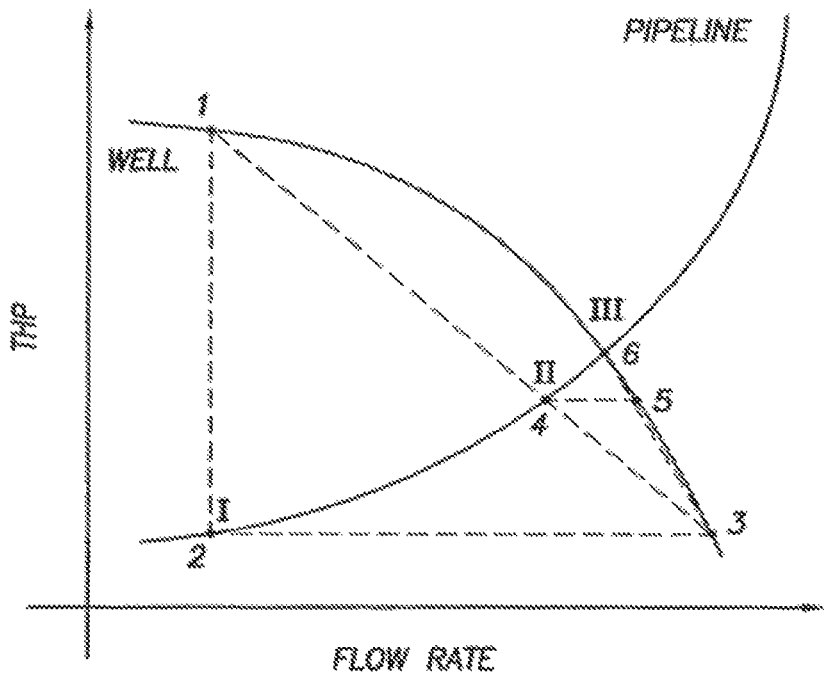
FIG. 2 illustrates the balancing process for a single production well and a network pipeline.

FIG. 2 illustrates the balancing process for a single production well and a network pipeline. The two curves show the flow rate vs. THP response of the well and the pipeline. The solutions at successive network balancing iterations are represented by Roman numerals (I, II, . . . ). In the procedure described below the superscripts 1, 2, . . . represent points 1, 2, . . . on the figure while the subscripts w and p represent the well and pipeline sides at the boundary node.

I. Given an initial value for the well's THP, $p_w^1$, solve the production system in the reservoir model to obtain the corresponding flow rate, $Q_w^1$. Set the well's corresponding source node in the network to a constant rate $Q_p^2 = Q_w^1$ and solve the network model. The network returns a source node pressure $p_p^2$.

II. Update the well's TIP control target to $p_w^3 = p_p^2$ and solve the production system in the reservoir model to obtain the new flow rate $Q_w^3$. We now have two points on the well response curve and we take the gradient between them as a tubing head PI: $pI^{II} = (Q_w^3 - Q_w^1)/p_w^3 - p_w^1)$ (the superscript II represents the balancing iteration number). Set the well's corresponding source node in the network to a linear inflow relation with this PI and the corresponding intercept pressure, and solve the network model. The network returns a source node pressure, which lies on the intersection of the pipeline response curve and the source's linear inflow relation.

III. Update the well's THP control target to $P_w^5 = p_p^4$ and solve the production system in the reservoir model to obtain the new flow rate $Q_w^5$. Use the latest two points on the well response curve (3 and 5) to calculate a new tubing head PI and intercept pressure, and solve the network with the new source node conditions. The network returns a source node pressure $p_p^6$.

Step III is repeated, using the latest pair of points on the well response curve, until convergence is achieved. The balancing calculation is deemed to have converged when the changes in all source node pressures and flow rates are within a percentage tolerance. For subsequent balancing calculations we start with the wells' latest THP values and use their most recent tubing head Pi for the gradient in the network source node conditions.

Coupling Multiple Reservoir Simulations

Here the controller's purpose is to couple two or more reservoir simulations that are subject to common global constraints. The coupled system may in addition contain one or more surface networks, but this is not compulsory. The reservoir simulations may comprise a mixture of black oil models with different sets of active phases (undersaturated oil and water, 3-phase, etc.) and compositional models with different sets of pseudo-components. The PVM communication protocol allows the simulation models to run on different computer platforms, offering the advantage that they can be advanced through time in parallel.

A large field often comprises a number of independent isolated reservoirs. These may have been history matched individually with their own simulation models. But if it is intended to produce them into common surface facilities constrained by design capacities, they can no longer be regarded as independent units during prediction studies. They are likely to be subject to global constraints on production, which may include a target oil offtake rate and a maximum water or gas handling capacity. The reservoirs may also be coupled by global injection constraints, for example if they share the same water injection plant, and water or gas produced by some of the reservoirs may be reinjected into others. The ability to simulate the reservoirs as a coupled system while retaining their individual model descriptions is a distinct advantage to the engineer. Without this capability it would be necessary to amalgamate the models into a single huge grid with a fluid description containing the super-set of all phases or components present in the models.

The solution we have implemented in the controller is similar to the Reservoir Coupling option that has been available for a number of years in the black oil simulator.[11] However, the former Reservoir Coupling option is restricted to that particular simulator alone. It was implemented by enabling the simulator to run in two modes: as its own controller and as a slave task. In the new system the Reservoir Coupling algorithms are contained in the controller, which is capable of coupling to both the black oil simulator and a compositional simulator. The simulators (and any coupled network simulator) run as slave tasks. In principle the controller could couple to any simulator having an appropriate communication interface. Another advantage of the new system is that it offers a wider choice of surface network simulators; in the original system the selection was limited to the simple network model that was built into the reservoir simulator.

The Coupling Scheme

When there are multiple reservoir simulations the controller uses a 'loose' coupling scheme. This apportions the global production/injection targets to the principal groups of the individual simulation tasks (and balances any surface networks) at the start of each 'synchronization step'. Thereafter, each simulation task advances independently to the next synchronization step, taking whatever time steps and Newton iterations it requires. Note that a 'tight' coupling scheme as described above would require all the simulation tasks to take identical time steps.

The user sets a maximum length for the synchronization steps. The controller may select a shorter synchronization step when, for instance, the coupled run approaches a report time in one of the reservoir simulation tasks, since all tasks are automatically synchronized at the report times in any of the simulations. The controller may also reduce the synchronization step below the maximum value if during the previous step the production or injection rate of any simulation task changed by more than a defined fraction. This is done to limit the amount by which the total production and injection rates of the coupled system may drift from the global targets due to the changes in reservoir conditions that occur over the synchronization step.

Balancing the Coupled System

Balancing the coupled system involves two objectives. Firstly, any global constraints on overall production and injection rate must be apportioned between the simulation tasks. The global constraints may include re-injection targets in which produced water or gas is transferred between reservoirs. Secondly, if there is a surface network, this must be balanced with the production/injection rates.

Figures 3, 18:
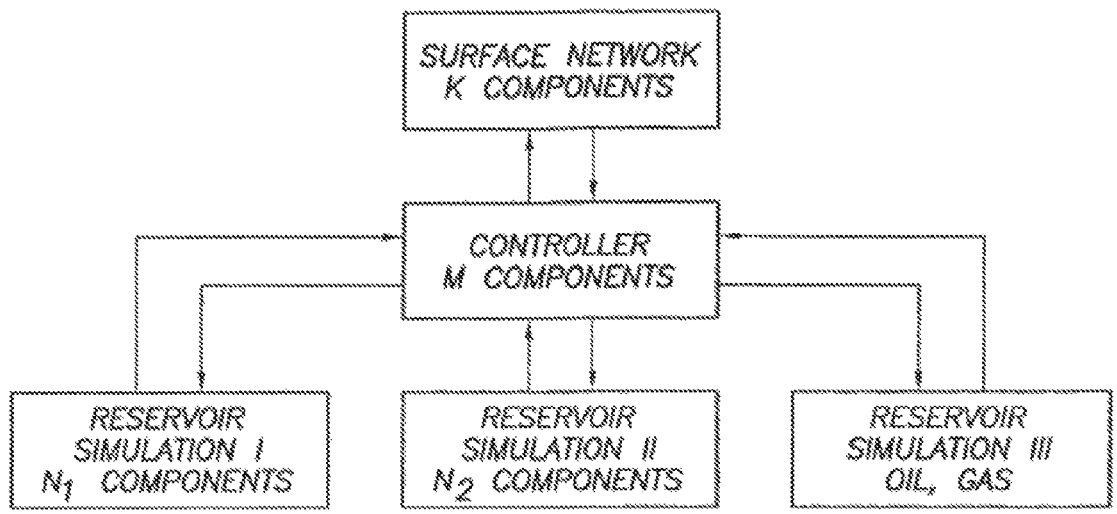
FIG. 3 illustrates a case of a controller coupling two compositional reservoir simulations with N1 and N2 components respectively.
FIG. 18 depicts a table.

There is a choice of two methods for handling global rate constraints. The first method is equivalent to the 'guide rate group control' method built into the reservoir simulators. The controller apportions any global rate. targets among the principal place if the coupled simulations consist of a mixture of black oil and compositional runs. In this case the black oil wellstreams are converted into compositional streams. In the following sections we describe the lumping/delumping schemes as used in this work. FIG. 3 illustrates a case of a controller coupling two compositional reservoir simulations with N1 and N2 components respectively, a black oil reservoir simulation and a compositional surface network model with K components.

Compositional Well Stream

Consider the case of a reservoir simulation run with N components coupled to an external network with K components (typically $K \geq N$). The controller has a super-set of M components (where $M \geq \max(K,N)$). This configuration requires the delumping of the reservoir simulation's N components into the controller's M components and lumping these into the network's K components. In other words, given the composition of the fluid mixture from the reservoir at each balancing iteration, the aim is to calculate the composition of the controller's delumped M-component mixture.

We use the so-called split parameters Sj. In the following explanation, the superscripts l and d designate the lumped and delumped mixtures respectively. We assume that the super-set of components is detailed enough to encompass any component in the lumped sets of components. Consider a fluid mixture of $N^l$ components that we wish to delump into a mixture of $N^d$ components ($N^d > N^l$). In this case, some of the pseudo-components will be split following their original compositions (they are, themselves, mixtures of components and pseudo-components). One needs, for this purpose, the lumping split parameters $S_j$, $j=1, \ldots, N$ defined as:

$$z_i^d = S_j z_j^l, i=1, \ldots, N^d, \qquad (1)$$

where $z_j^l$ and $z_i^d$ are the feed mole fraction of component j and i in the lumped and delumped mixtures respectively. The Sj parameters must be specified in the input data. The user may already have information about their values at some PVT samples, as these values may have been used previously to lump the mixture into the set of pseudo-components for compositional simulation. Sj might, of course, vary from one PVT sample to another. However, each well or group of wells could be associated groups of the coupled reservoirs in proportion to their guide rates. The guide rates of these groups may be set by the user or defined as functions of their production/injection potentials. The controller must query the potentials of these groups, determine their guide rates, and give them appropriate production/injection targets. If a group cannot meet its target, any shortfall is made up by increasing the targets of the groups that can flow at a higher rate. The group control logic within the reservoir simulators apportions the group targets imposed by the controller down to their wells. (In a later round of development the controller will be able to apportion the targets directly down to the wells in all the coupled reservoirs, bypassing the group control logic in the simulators.)

If the coupled system includes a surface network, a second method of handling global rate constraints by network chokes is available. The controller passes the constraint to the network simulator, which adjusts the pressure drop in a nominated choke branch to limit the flow rate to the required value. This method is available whenever a surface network is coupled to one or more reservoirs, as both the surface network simulators that can be coupled to the controller are compatible with this option.

The network is balanced with the reservoir models in the manner detailed above. At each balancing iteration, the production/injection rates in each reservoir are solved, the network source/sink terms are updated, the networks are solved and the resulting boundary node pressures are communicated to the reservoir models to update the well THP constraints.

Compositional Aspects

When compositional models are employed in one or more of the coupled simulations, the simulations may in general use different sets of pseudo-components. The controller should use a super-set of components (which we shall call the 'detailed set'). The controller should translate (or 'delump') each simulation model's wellstreams into this detailed set of components. Conversely, when the controller passes a wellstream to a simulation model (a gas injector in a reservoir model, or a source node of a compositional network model), it must translate (or 'lump') the wellstream into the model's own set of pseudo-components. A similar process takes with a given set of split parameters provided from the PVT sample from either that well or the closest well in its neighbourhood. In other words, instead of having one split parameter set for each compositional simulation, we will have a split parameter set per region. The split parameters sets are entered in the controller's data as tables.

For the inverse task of lumping the controller's detailed set of components into a simulator's lumped set, no additional data need be supplied. The parameters can be generated automatically, given that the controller's super-set of components is at least as detailed as that of the network or any or the coupled reservoir models (in other words, all the lumped pseudo-component sets are spanned by the controller's detailed set of components/pseudo-components).

Black Oil Well Stream

By delumping a black oil wellstream we aim to retrieve the detailed components' molar rates, essentially converting a black oil wellstream into a compositional wellstream. This can be achieved with differing degrees of accuracy by options ranging from setting constant oil and gas compositions for the whole run to using the results of a depletion process (CVD, CCD, DL, DE). The latter represents the inverse process of black oil PVT table generation.

The simplest method is to assign fixed compositions (component mole fractions) to stock tank oil and gas. These could be applied over the whole reservoir or, if the oil properties vary across the reservoir, different oil and gas compositions may be assigned to individual wells. Furthermore, stock tank oil and gas compositions can be reassigned at any time during the run, allowing them to change over time.

ECLIPSE 100 has an API tracking feature that allows oils of different properties to mix within the reservoir. The PVT properties of the oil mixture are parameterised by the oil surface density. To provide a delumping option compatible with API tracking, stock tank oil and gas compositions may be tabulated against the density of oil at surface conditions.

A third option (offering the greatest accuracy) is to provide tables of reservoir liquid and vapor component mole fractions vs. saturation pressure. These can be obtained from a depletion process, ideally the same process that was used in the generation of the black oil PVT tables. Assume that the PVT sample used in the depletion process consists of $N^l$ components (the superscript l denotes "lumped" since the depletion experiment basically uses a subset of the controller's super-set of components). For each pressure there is a vapor composition $y_i$ and a liquid composition $x_i$, i=1, ..., $N^l$. The information required by the controller is the total mole fraction and total molar rate of each component. The total composition (feed composition) is related to the phase compositions by $$z_i = \alpha y_i + (1-\alpha) x_i, \quad (2)$$

where $\alpha$ is the vapor fraction:

$$\alpha = \frac{n^V}{n^V + n^L}; \quad (3)$$

$n^V$ and $n^L$ are the total number of moles in the vapor and liquid phases respectively. Equation (3) can be written as:

$$\alpha = \frac{m^V/M^V}{m^V/M^V + m^L/M^L}; \quad (4)$$

$m^V$, $M^V$, $m^L$ and $M^L$ are the mass and molar weight of the vapor and liquid phases respectively. In terms of molar rates, $\alpha$ can be written as:

$$\alpha = \frac{Q_m^V/M^V}{Q_m^V/M^V + Q_m^L/M^L}; \quad (5)$$

$Q_m^V$, and $Q_m^L$ are the mass rate of the vapor and liquid phases respectively.

Given the saturation pressure, the vapor and liquid compositions may be calculated by table lookup. Knowing the component/pseudo-component mole fractions and molar weights, the vapor and liquid molar weights are:

$$M^V = \sum_{i=1}^{N^l} y_i M_i, \quad (6)$$

and $$M^L = \sum_{i=1}^{N^l} x_i M_i \quad (7)$$

From mass conservation, the mass rates of the vapor and liquid phases are given by:

$$Q_m^V = Q_m^{gV} + Q_m^{oV}, \quad (8)$$

$$Q_m^L = Q_m^{oL} + Q_m^{gL}, \quad (9)$$

respectively. In Equations 8 and 9, $Q_m^{gV}$, $Q_m^{oV}$, $Q_m^{oL}$ and $Q_m^{gL}$ denote the mass rates of the free gas, vaporized oil, free oil, and dissolved gas respectively. These quantities can be obtained from $$Q_m^{gV} = \rho_s^g q_{sv}^{gV}, \quad (10)$$

$$Q_m^{oV} = \rho_s^o q_{sv}^{oV}, \quad (11)$$

$$Q_m^{oL} = \rho_s^o q_{sv}^{oL}, \quad (12)$$

and, $$Q_m^{gL} = \rho_s^g q_{sv}^{gL}. \quad (13)$$

In the above, $q_{sv}^{gV}$, $q_{sv}^{oV}$, $q_{sv}^{oL}$, and $q_{sv}^{gL}$ denote the free gas, vaporized oil, free oil, and dissolved gas surface volume rates respectively.

The vapor (liquid) mass rate of component i, i=1, ..., $N^l$ is a straightforward multiplication of the total vapor (liquid) mass rate and the component's vapor (liquid) mole fraction $y_i$ ($x_i$).

Note that this delumping method allows us to retrieve the most detailed compositional information possible in a black oil delumping process, provided that the pressure intervals in the phase composition vs. pressure tables are the same as those in the black oil PVT tables. Having finer pressure intervals than those in the black oil PVT tables does not necessarily result in a better compositional fluid description.

Once the black oil stream is delumped into a compositional stream, the latter might also need to be delumped into the super-set of components as described in the previous subsection. This applies if the controller's super-set of components is different from the set to which the black oil wellstream is delumped.

Validation example: To validate the black oil wellstream delumping scheme used in this work, we have compared well composition over time from a compositional reservoir model with a delumped black oil wellstream from an equivalent black oil reservoir model.

Figure 4:
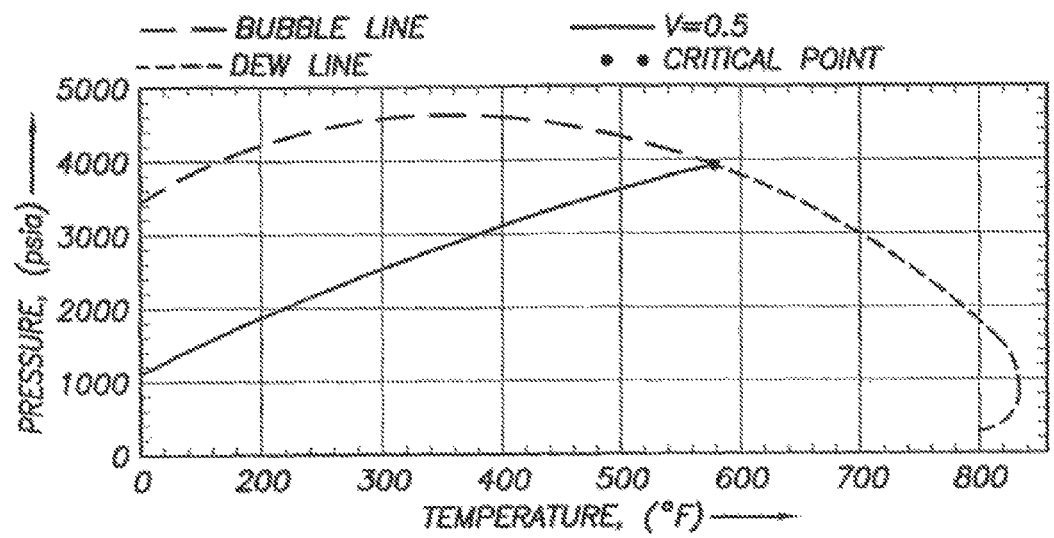
FIG. 4 depicts the PT diagram corresponding to the composition of Table 1 (the two-parameter Peng-Robinson equation of state is used)

FIG. 18 depicts a table showing the initial composition in the compositional reservoir model. FIG. 4 depicts the PT diagram corresponding to this composition (the two-parameter Peng-Robinson equation of state is used). The reservoir temperature is fixed at 284° F.; the bubblepoint pressure corresponding to this temperature is 4522 psi. The initial pressure at the top of the reservoir is 4600 psi. The. entire reservoir is initially in the liquid phase (undersaturated). Oil is produced at a constant total rate of 2500 stb/day through seven wells.

Figure 5:
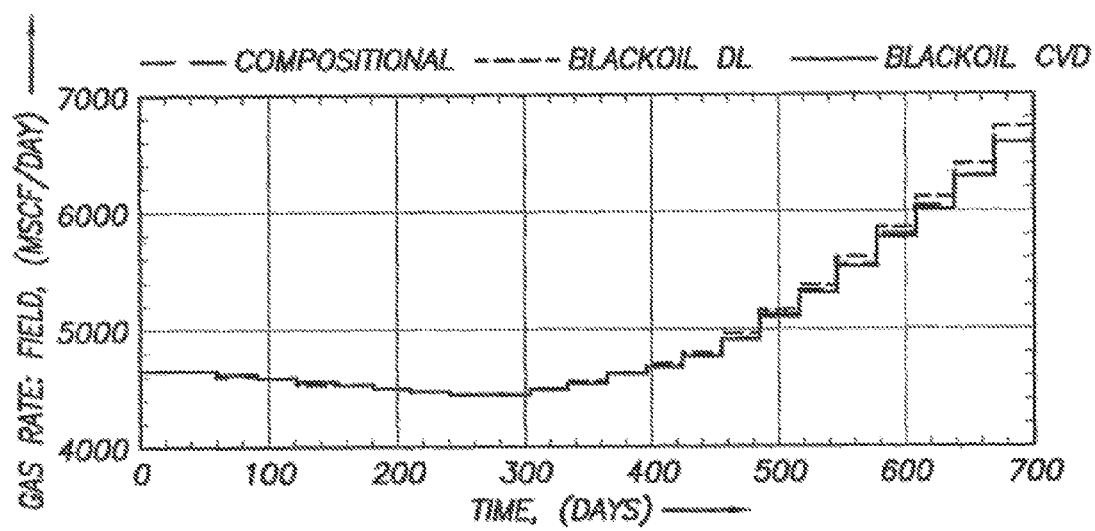
FIG. 5 shows the gas production over a period of 2 years.

Two black oil PVT models have been used for this comparison, based respectively on a differential liberation and a constant volume depletion. In both cases the black oil model consists of a mixture of live oil and wet gas. FIG. 5 shows the gas production over a period of 2 years. There is an excellent match between the compositional model and the two black oil models, with the CVD model providing the better match. We also tried using a live oil and dry gas black oil model), but this gave a significant discrepancy in the gas breakthrough time and the composition of the delumped black oil wellstream. This is to be expected, since the quality of the delumped results is directly related to the quality of the black oil model.

Figure 6A:
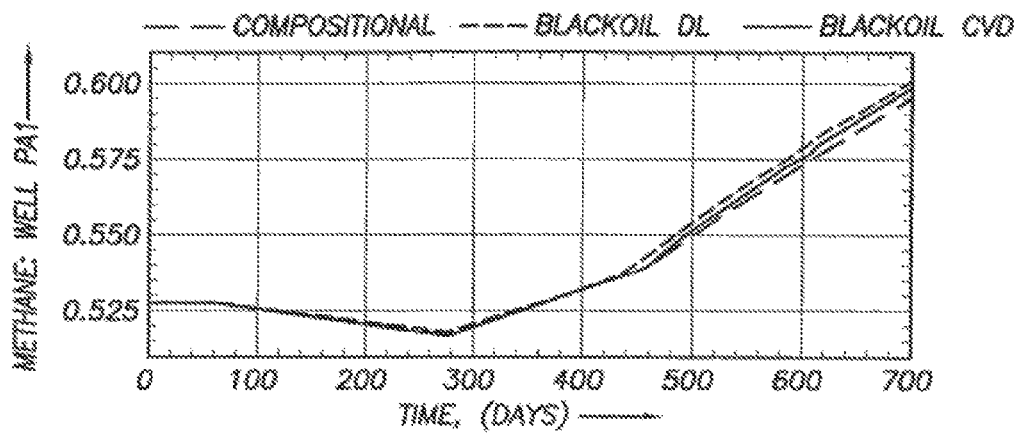
FIG. 6 shows the methane composition and the composition of the pseudo-components HC13 and HC43 over time.
Figure 6B:
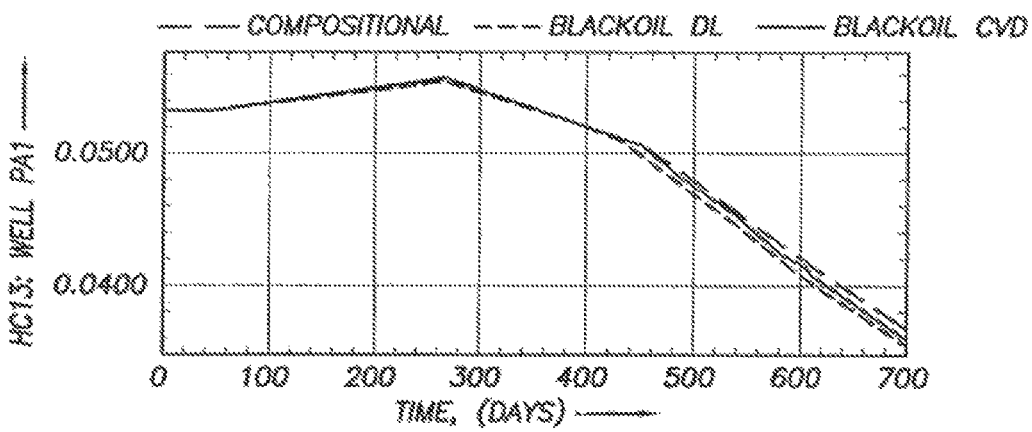
Figure 6C:
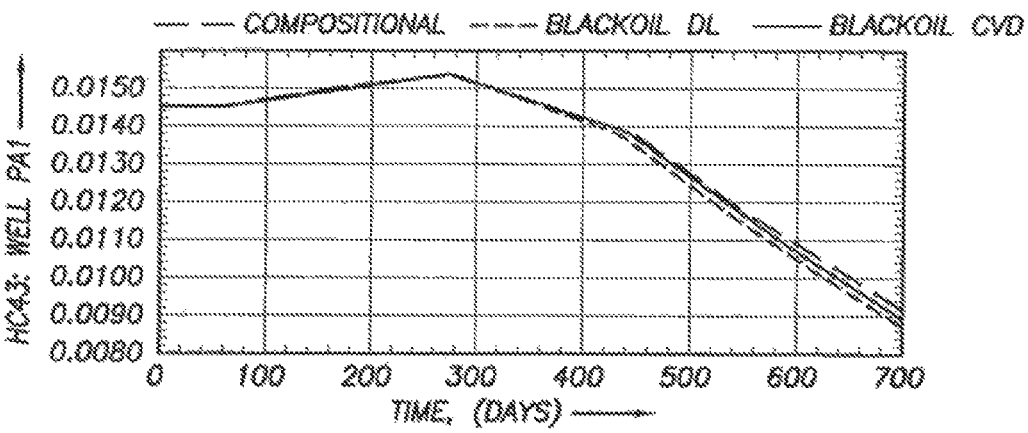

The delumping tables of liquid and vapor composition vs. pressure were obtained from the experiments (DL and CVD) used to prepare the black oil PVT tables. FIG. 6 shows the methane composition and the composition of the pseudo-components HC13 and HC43 over time. Similarly to the gas production rate, the composition of the delumped black oil wellstream is in very good agreement with the wellstream from the compositional model.

EXAMPLES

We present two example applications that illustrate the features described above. The first example describes multiple reservoirs coupled to a common surface network, with global constraints applied via network chokes. The second example illustrates component delumping and gas re-injection between three reservoirs with different fluid models.

Example I

Coupling Multiple Reservoirs to a Network

Figure 7:
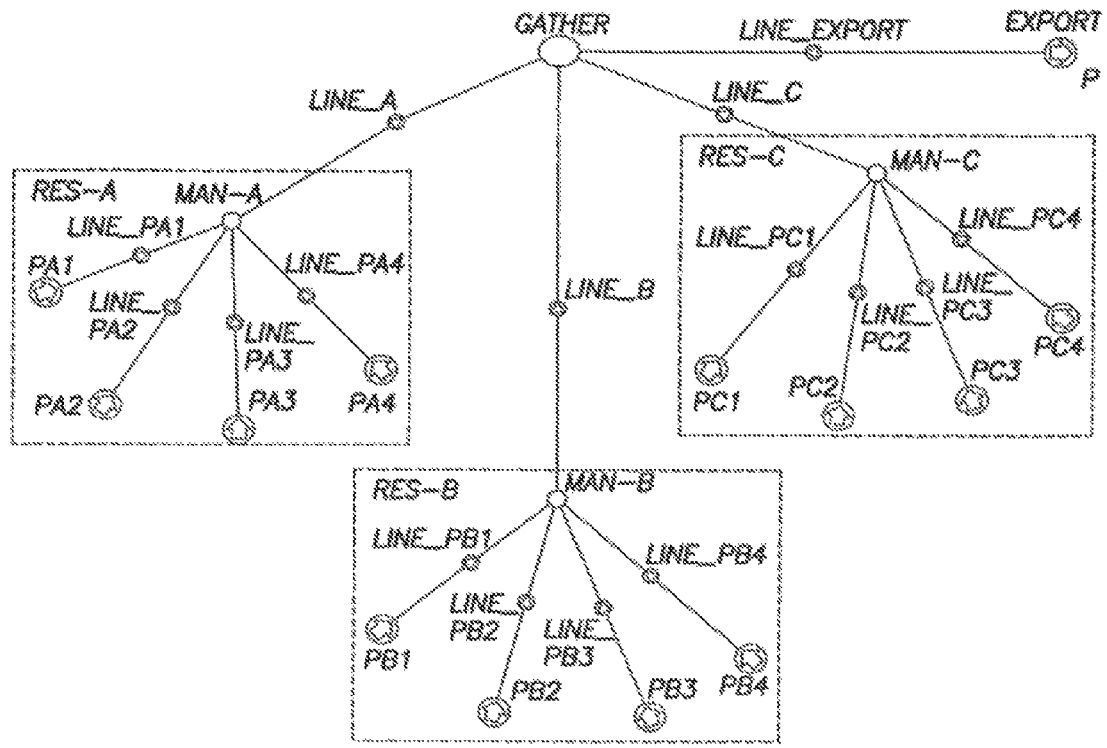
FIG. 7 shows a schematic diagram of the network, which couples to the reservoir models at the well tubing heads.

Three sub-sea reservoirs are connected to a common production network. FIG. 7 shows a schematic diagram of the network, which couples to the reservoir models at the well tubing heads. Each reservoir contains four production wells. The produced fluids from each well flow along separate seabed flow-lines to a manifold, where they co-mingle. Each reservoir has a single manifold, and a separate riser to bring the fluid to a common production platform. At the platform the fluid from the three risers is co-mingled and transported to shore along an export pipeline. Each reservoir has the same black oil fluid description; the oil is initially undersaturated with a dissolved gas concentration $R_s$=1.5 Mscf/stb. Initially only two of the reservoirs, Reservoirs A and B, are on stream; Reservoir C comes on stream eight months later.

The total deliverability is limited by a pressure constraint of 500 psia at the on-shore export node. But the total oil production rate is also subject to an upper limit of 30,000 stb/day. This constraint is applied by a choke at the beginning of the export pipeline. The network simulator calculates the pressure drop across the choke that is necessary to reduce the oil flow to the required value. A third constraint is applied to the gas production from one of the reservoirs: Reservoir A. Its gas production is limited to 15,000 Mscf/day, and the constraint is applied by another choke positioned at the top of its riser.

Reservoir A re-injects half of its produced gas, and all three reservoirs inject water to make up a voidage replacement fraction of 0.8. Each reservoir therefore depressurises over time and produces with an increasing GOR and water cut. The GOR increase of Reservoir A is more pronounced because of its gas re-injection. However, the increasing trend of GOR and water cut is punctuated by workovers; the wells are set to close their worst-offending layer connection whenever their GOR reaches 4.0 Mscf/stb or their water cut reaches 0.7 (each well is completed in three layers).

Figure 8A:
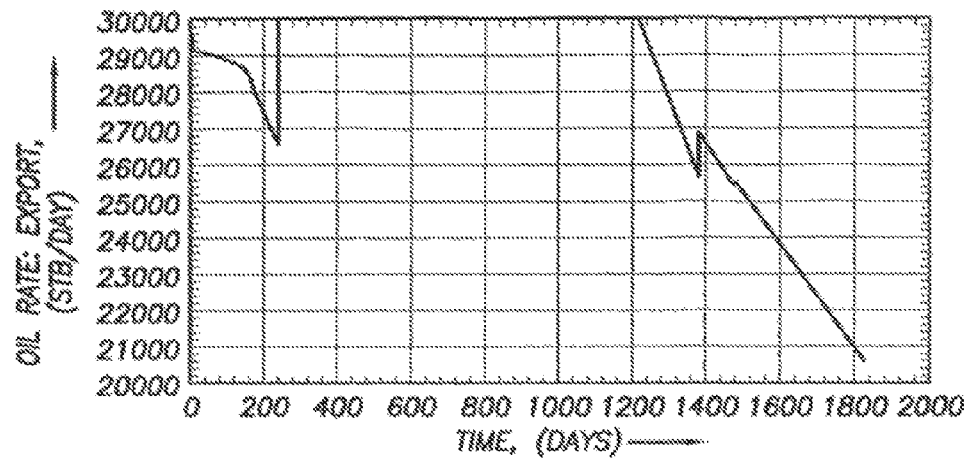
FIG. 8 shows the oil, gas and water flow rates in the export line.
Figure 8B:
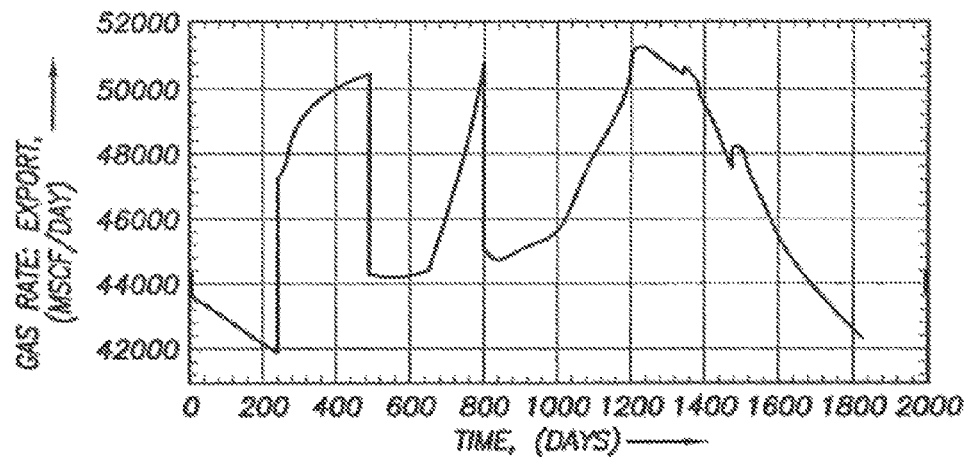
Figure 8C:
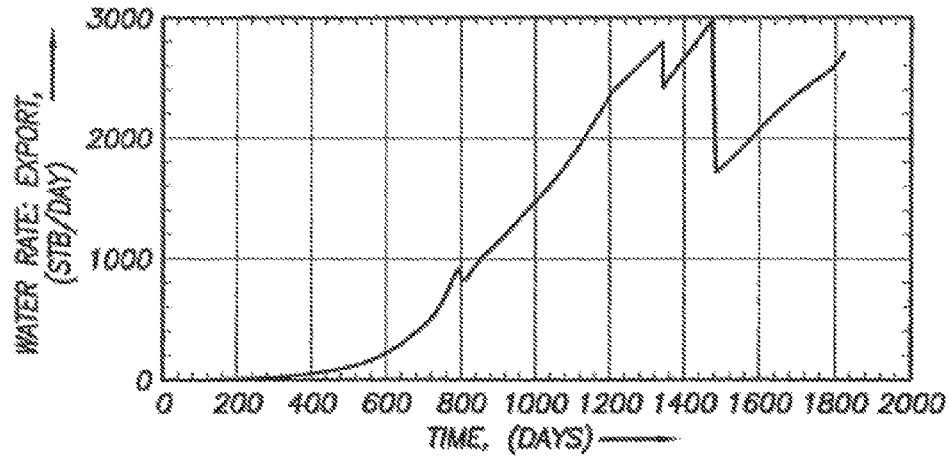

FIG. 8 shows the oil, gas and water flow rates in the export line. Initially only Reservoirs A and B are on stream, and between them they are unable to produce at the maximum oil rate. The export oil rate declines for 8 months (243 days) until Reservoir C comes on stream. Thereafter the productivity of the combined system exceeds 30,000 stb/day and the network model adjusts the choke pressure drop in the export line to keep the oil rate at this limit. Production continues at this plateau until 1200 days, when the productivity of the system falls below the limiting rate and the oil rate begins to decline. There is a brief increase in oil rate around 1400 days, which coincides with a workover on one of the Reservoir A wells.

Figure 9A:
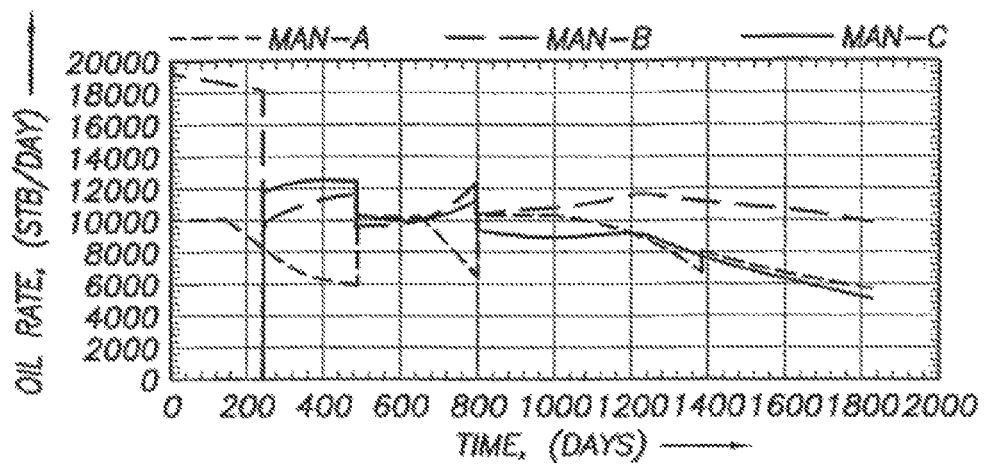
FIG. 9 shows the oil, gas and water production rates from each of the three reservoirs.
Figure 9B:
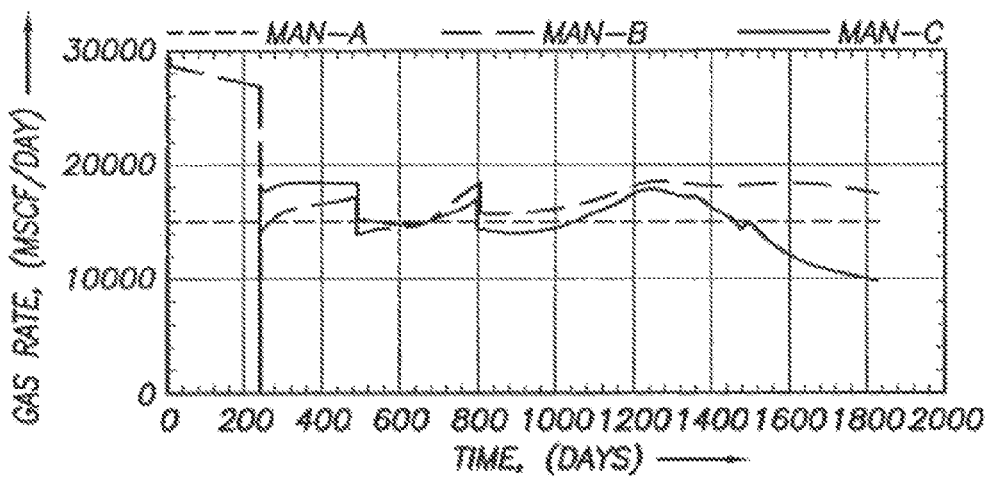
Figure 9C:
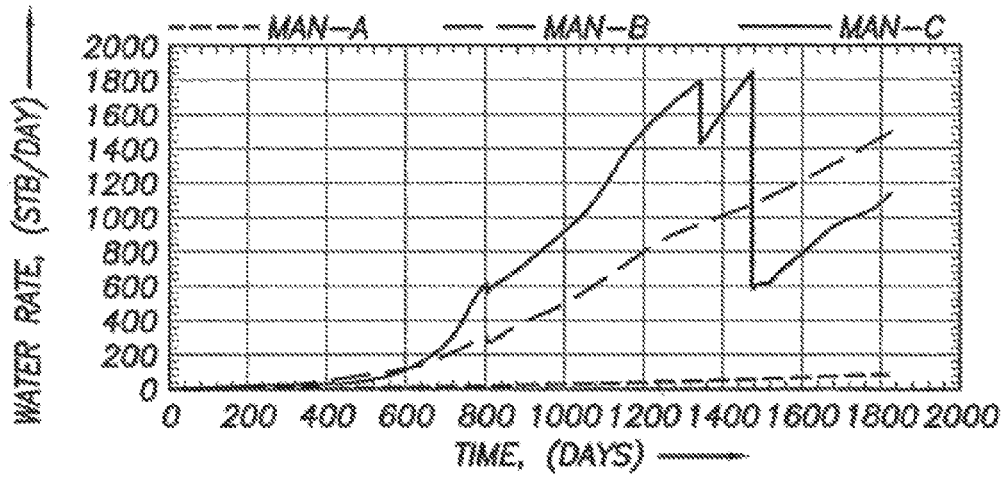
Figure 10:
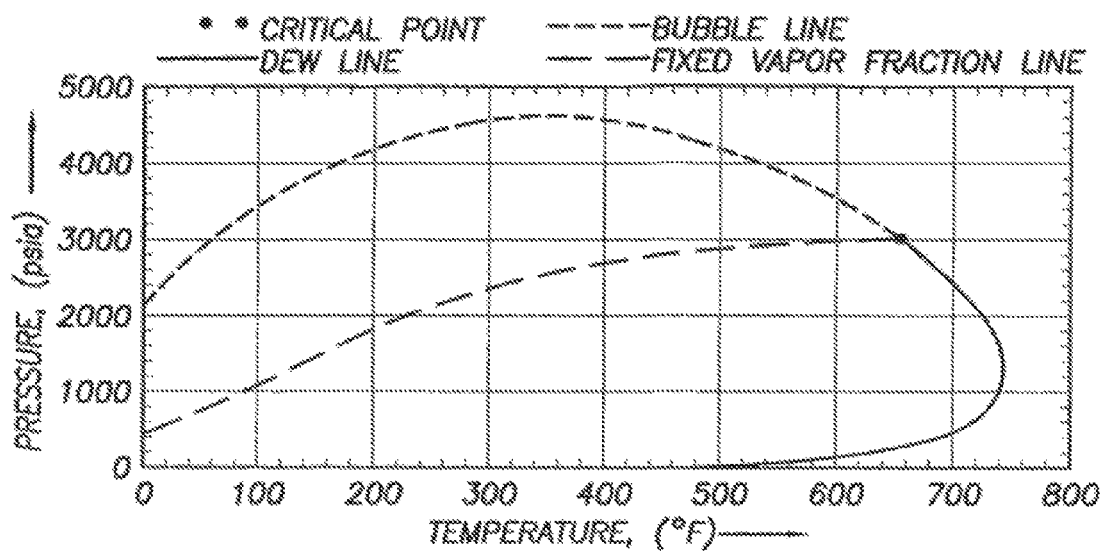
FIG. 10 shows the phase plot for the PVT samples used in Reservoir B.

FIG. 9 shows the oil, gas and water production rates from each of the three reservoirs. Note that the gas rate from the manifold of Reservoir A remains constant at the limiting value of 15,000 Mscf/day. Thus the gas production rate from Reservoir A is always limited by that constraint (the valve in that reservoir's riser always has a pressure drop across it to control the production), and the oil production from that reservoir thus depends solely on the GOR. Initially the oil production from Reservoir A is 10,000 stb/day, reflecting the initial $R_s$=1.5. The oil production declines when free gas breaks through to a well, and increases again whenever the gas breakthrough is shut off with a workover. During the plateau period (from 240 to 1200 days) the oil production from the other two reservoirs adjusts to compensate for the changing oil rate from Reservoir A. The automatic valve in the export line adjusts the network's backpressure to keep the total oil rate at 30,000 stb/day. The first two workovers in Reservoir A occur during this period (at 486 and 796 days). A third workover occurs in Reservoir A at 1384 days, but this is in the decline period so it results in a slight increase in the total oil production.

Example II

Component Delumping and Gas Re-injection

Three reservoirs with different fluid models are coupled through global production and injection constraints. Each reservoir has seven producers. Reservoirs A and B have three water injectors each. Reservoir C has four gas injectors. As in Example I, each reservoir has a single manifold. The produced fluid from manifolds MAN-A, MAN-B and MAN-C is gathered at the GATHER point where gas is separated, some of which is re-injected in Reservoir C. In this example we focus on some compositional aspects of the controller. Therefore, for the sake of clarity, no workovers are performed on any of the wells during the run.

The three reservoirs are isothermal. The fluid models for the three reservoirs are the following:

Reservoir A is a CVD black oil model (initial GOR=1.85 Mscf/stb) with a mixture of live oil and wet gas; the same model that was used in the black oil validation example (see FIG. 4 and FIG. 18). The reservoir temperature is 284° F. The initial pressure at the top of the reservoir is 4600 psi. The bubble point pressure corresponding to this temperature is 4522 psi.

Figure 11:
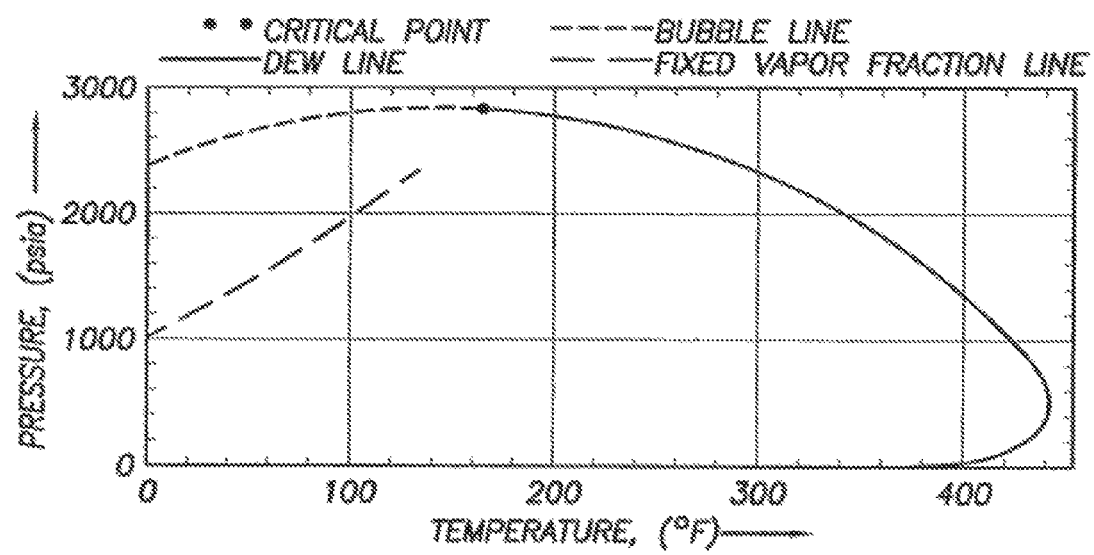
FIG. 11 shows the PT diagram corresponding to the model for Reservoir B.

Reservoir B contains undersaturated oil (initial GOR=1.60 Mscf/stb) characterized by a 6 components/pseudo-components model. The fluid mixture consists of $N_2$, $CO_2$, $C_1$, $C_2$-$C_3$, $C_4$-$C_6$, and the heavy fraction is represented by a single pseudo-component $C_7+$. The PT diagram corresponding to this model is depicted in FIG. 11. The reservoir temperature is 290° F. The initial pressure at the top of the reservoir is 4600 psi. The bubble point pressure corresponding to this temperature is 4538 psi.

Figure 12A:
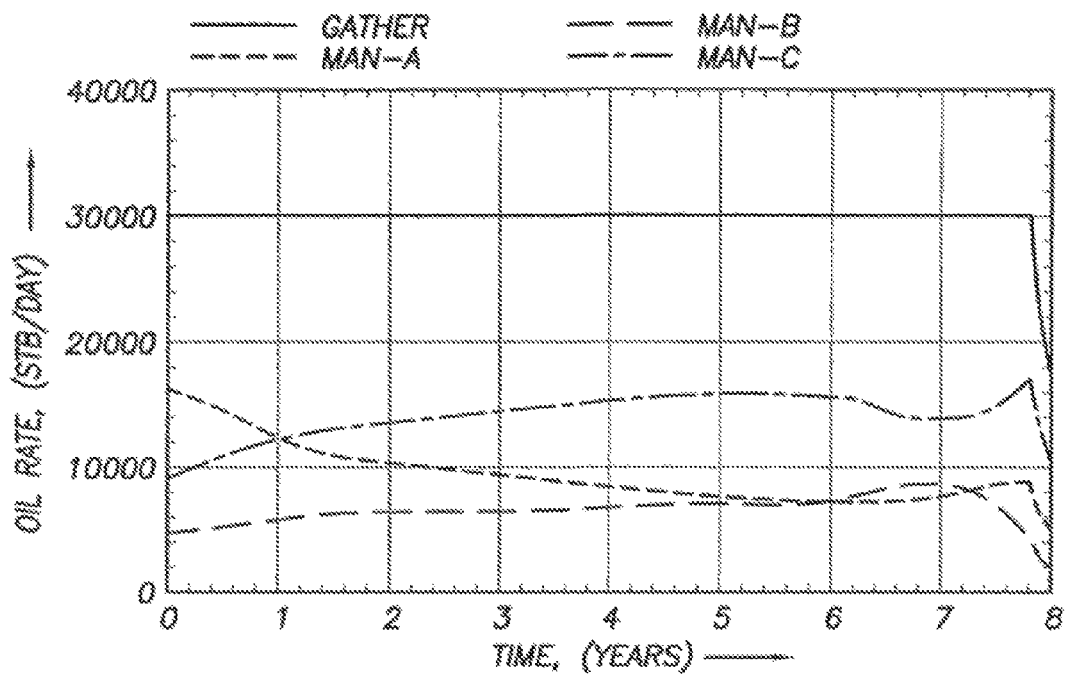
FIG. 12 shows the PT diagram corresponding to this model for Reservoir C.
Figure 12B:
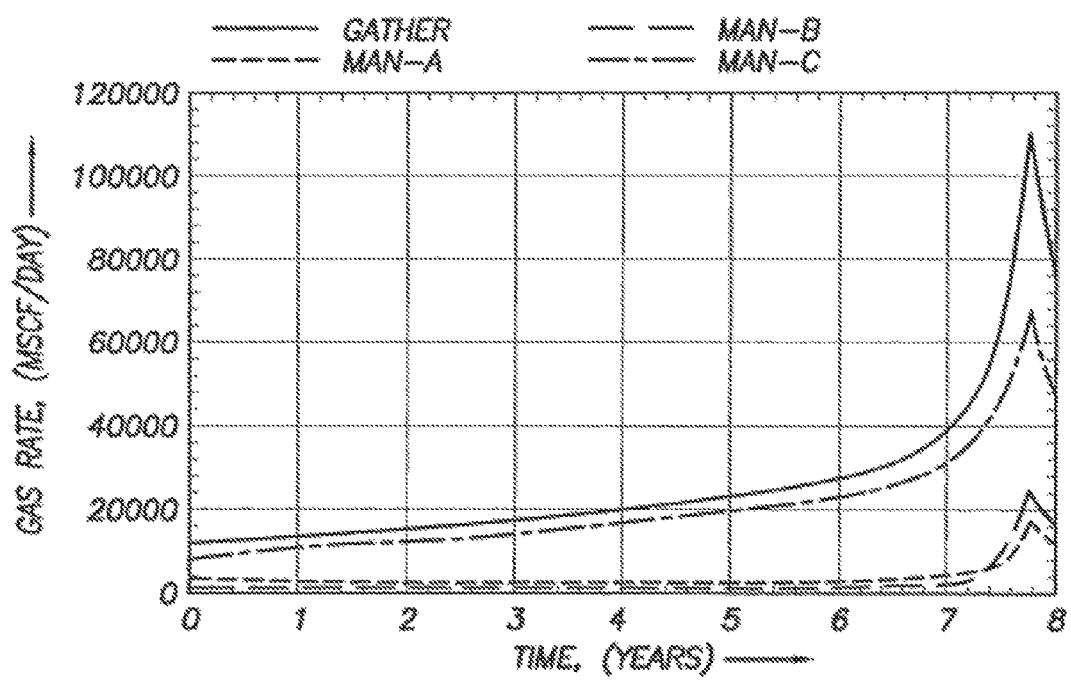

Reservoir C contains a near-critical gas condensate (initial GOR of around 8.5 Mscf/stb) characterized by an 11 components/pseudo-components model. The fluid mixture consists of $N_2$, $CO_2$, $C_1$, $C_2$, $C_3$, $C_4$-$C_6$, and the heavy fraction is represented by five pseudo-components HC7, HC13, HC18, HC23, and HC43. The PT diagram corresponding to this model is depicted in FIG. 12. The reservoir temperature is 200° F. The initial pressure at the top of the reservoir is 3000 psi. The dew point pressure corresponding to this temperature is 2784 psi.

The 11 components in Reservoir C are adopted as being the controller's super-set of components. At the beginning of each synchronization time step, the controller delumps the 6-components compositional wellstream from Reservoir B into the super-set of components using a split parameters table. Similarly, it delumps the black oil wellstream into the super-set of components using tables of vapor/liquid composition vs. saturation pressure as described in the previous section. The accuracy of the black oil delumping procedure is discussed in the previous section.

A global oil production target of 30,000 stb/day is applied. Each reservoir produces in proportion to a production guide rate equal to its oil production potential. Reservoirs A and B inject water to make up voidage replacement fractions of 0.8 and 1.0 respectively, subject to upper limits on the injectors' BHP. Reservoir C injects gas separated at GATHER to make up a voidage replacement fraction of 1.0. The gas injection rate in Reservoir C is, however, limited by the amount of gas produced in GATHER (the total produced gas) and by a gas compression capacity of 150,000 Mscf/day. The fluid mixture produced from the three reservoirs (represented as component molar rates) is separated using a flash at T=80° F. and p=65 psi followed by another flash of the resulting liquid at T=60° F. and p=14.7 psi. The resulting gas from the two-stage separator constitutes the source of the gas injected in MAN-C.

FIG. 12 shows the oil and gas production rates at GATHER as well as those from MAN-A, MAN-B and MAN-C. A period of 8 production years is presented. Reservoir A (the black oil model) has a higher potential oil production at the beginning of the simulation than Reservoirs B and C. Its oil production exceeds 16,000 stb/day. The remaining part of GATHER's oil target is made up by MAN-C producing around 9,000 stb/day and MAN-B producing around 5,000 stb/day. Because of its high initial GOR of 8.5, the gas production from MAN-C is over 75,000 Mscf/day while the gas production rates from Reservoirs A and B are around 30,000 and 7,500 Mscf/day respectively, as shown in FIG. 12. Over time, the oil production from Reservoir A decreases while the global production target is made up by increasing contributions from Reservoirs B and C. This continues for 6 years, when a significant increase of the GOR of two main producers in Reservoir C causes a decrease of Reservoir's C potential oil production. Reservoir A's oil production decline starts about six months later. About two months before the end of the eighth year, all the producers reach their minimum BBP limits and a sharp decrease in production occurs.

Figure 13A:
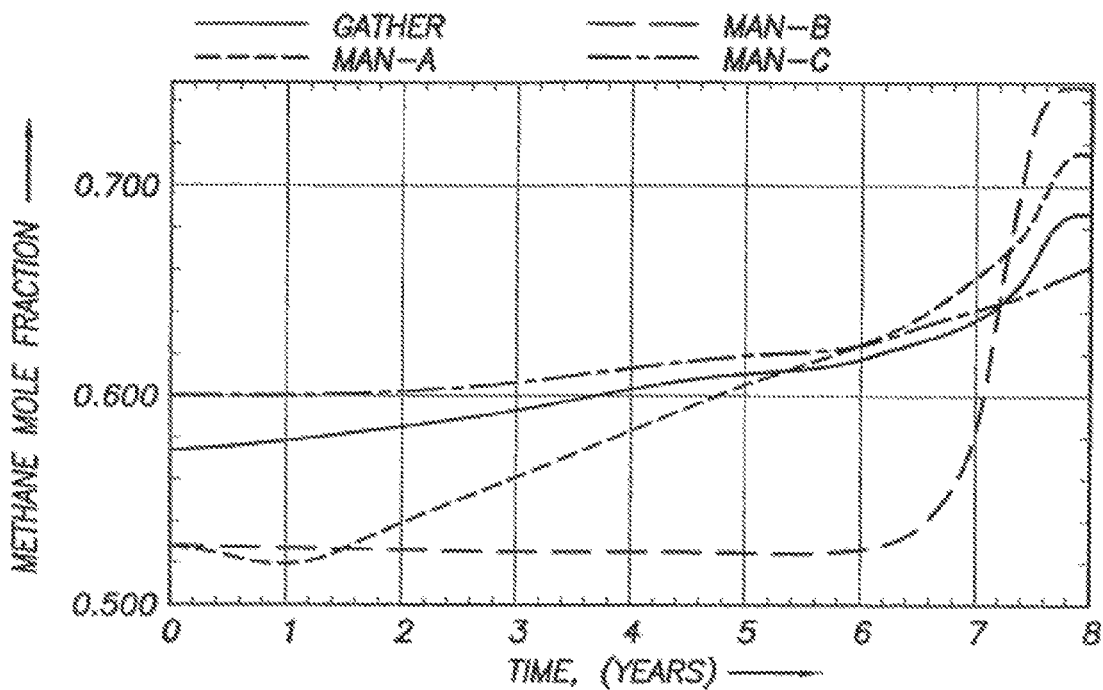
FIG. 13 shows a corresponding behavior of the produced fluid composition vs. time for the oil and gas production rates in FIG. 12.
Figure 13B:
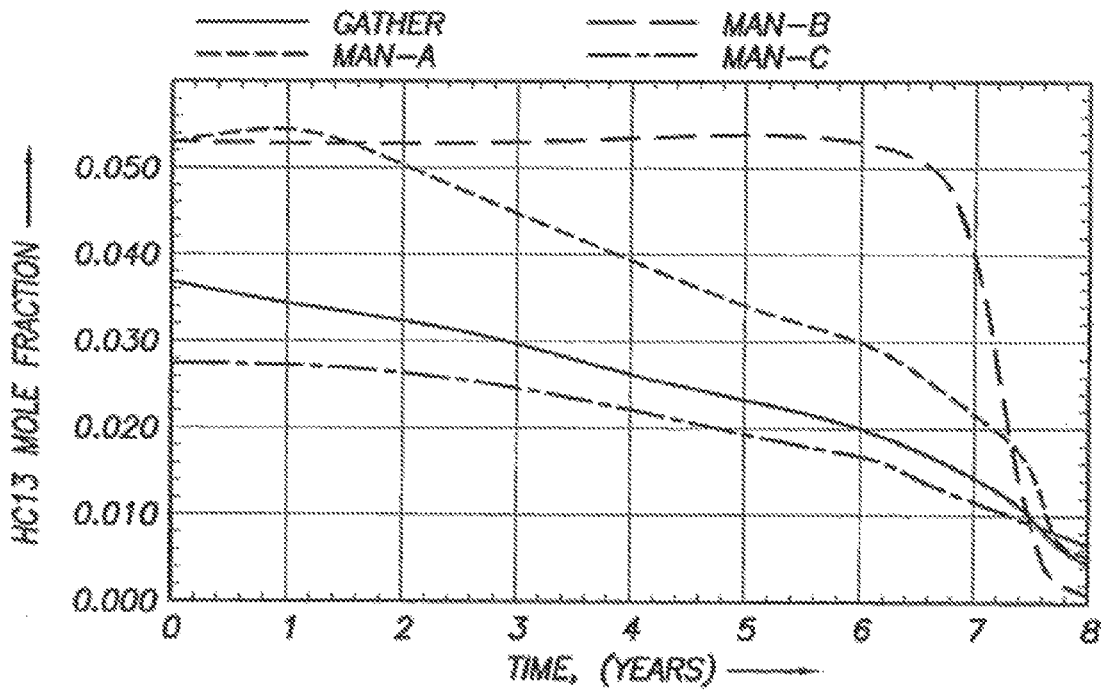

The oil and gas production rates in FIG. 12 are reflected in a corresponding behavior of the produced fluid composition vs. time as shown in FIG. 13. This figure shows the methane mole fraction and the pseudo-component HC13's mole fraction vs. time from the three reservoirs and GATHER. The methane mole fraction from Reservoir B varies only slightly over the first six years, when gas breakthrough occurs and the methane composition increases sharply thereafter. The inverse behavior takes place with regard to the HC13 composition vs. time; it decreases sharply after six years. The methane produced from Reservoir C has a higher mole fraction than that from the two other reservoirs. The composition of the combined fluid mixture from the three reservoirs depends on the component molar rates from these reservoirs. With the more substantial increase over time of the gas rate from Reservoir C compared to the two other reservoirs, the composition of the mixed stream becomes closer to that from Reservoir C, as shown in FIG. 13.

Figure 14:
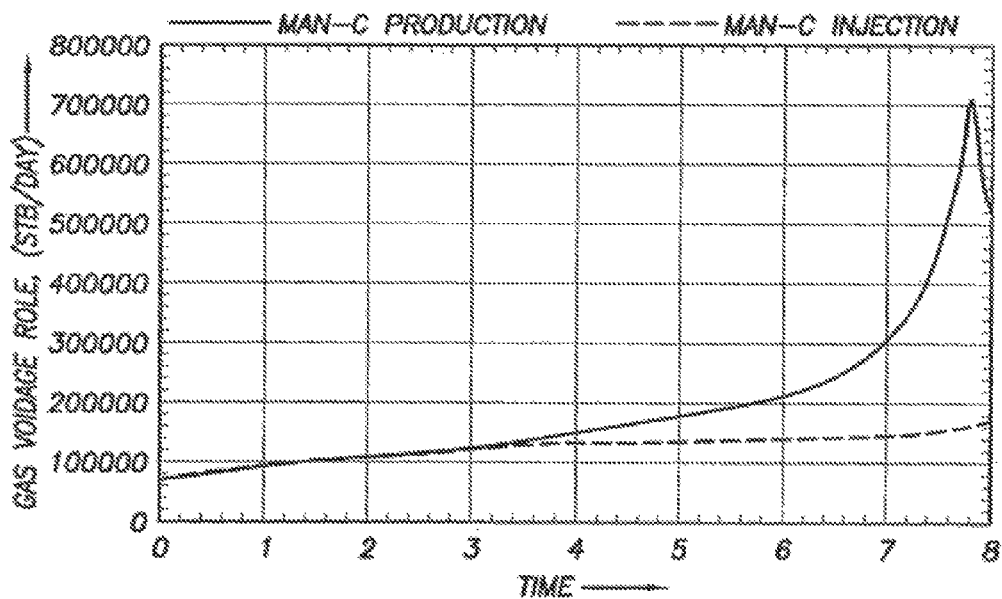
FIG. 14 shows the gas injection rate of Reservoir C.
Figure 15:
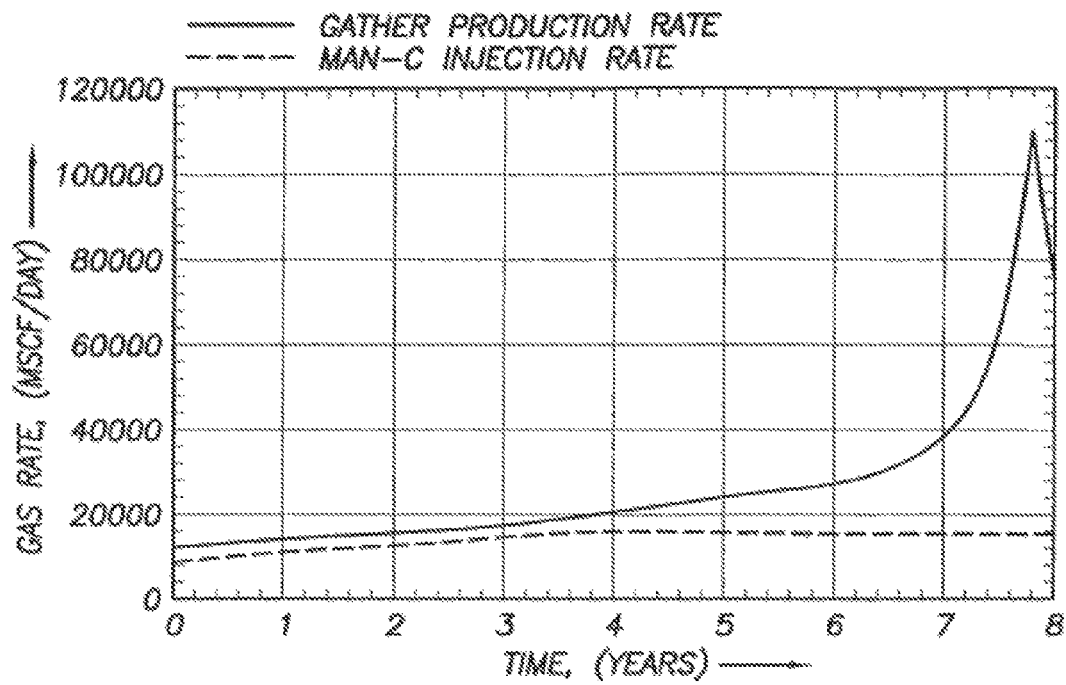
FIG. 15 shows the surface volume gas injection rate of Reservoir C.
Figure 16:
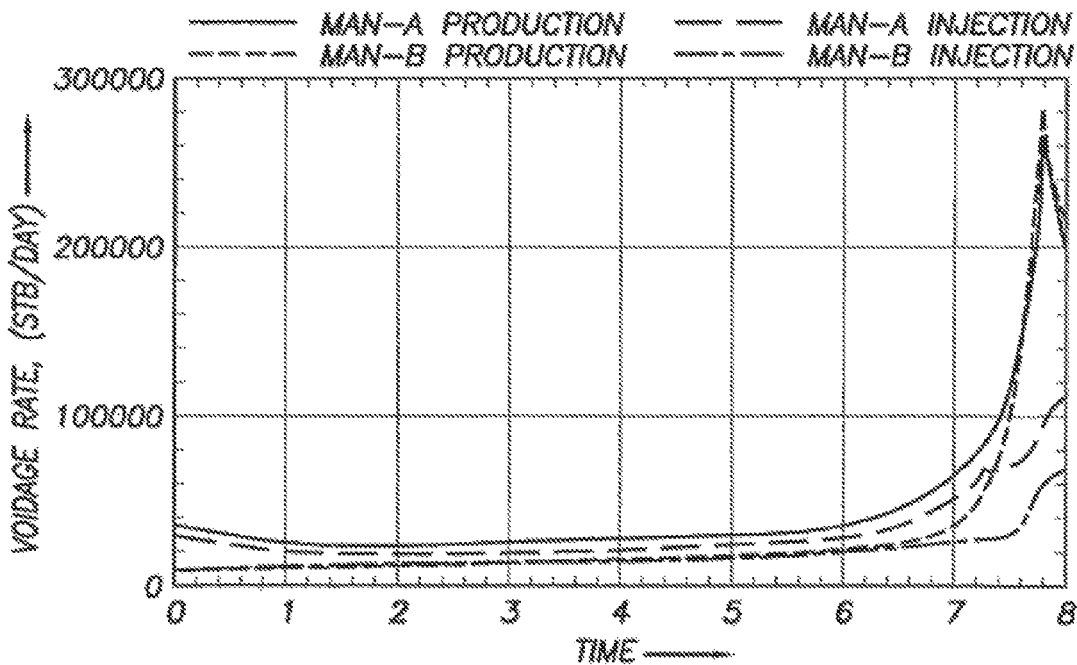
FIG. 16 shows the water injection rate of Reservoirs A and B.

For almost three and a half years, the gas injection rate in Reservoir C fulfils its voidage replacement target as shown in FIG. 14, where gas reservoir volume injection rate is depicted together with the reservoir's production voidage rate. At that time, the surface volume gas injection rate limit of 150,000 Mscf/day is reached as shown in FIG. 15. This figure also shows that the other injection rate limit (equal to the gas production rate at GATHER) is not reached at any point in the simulation. Reservoir A meets its water injection rate target until its water injectors reach their maximum BHP limits soon after the beginning of the eighth year as shown in FIG. 16. A similar behavior takes place for Reservoir B.

Figure 17A:
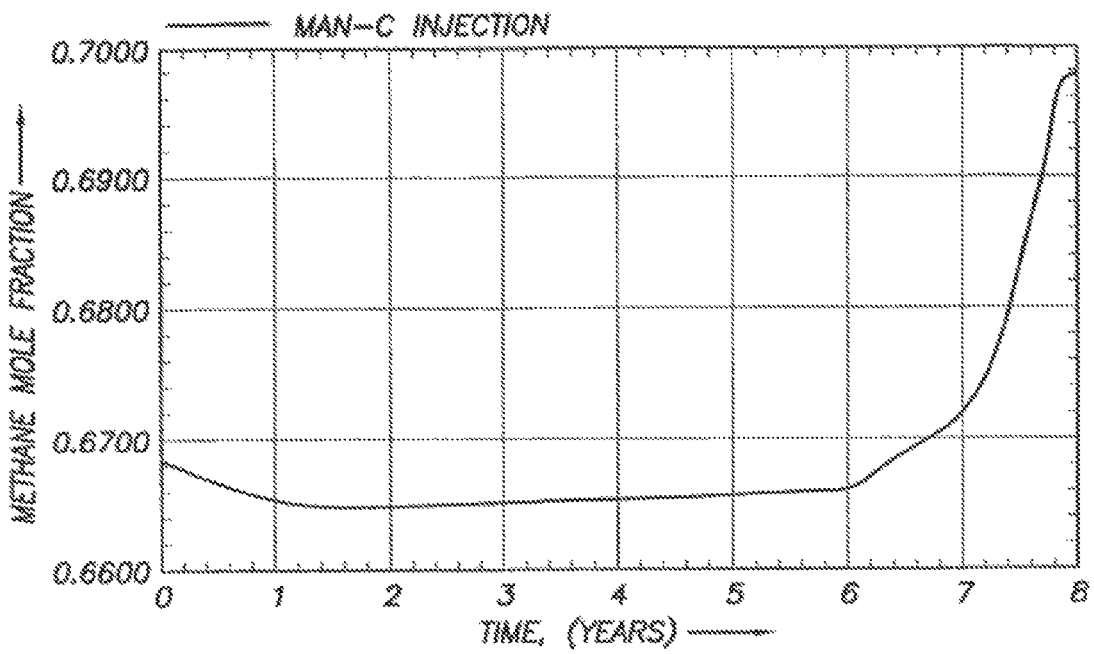
FIG. 17 shows the injected gas composition of Reservoir C.
Figure 17B:
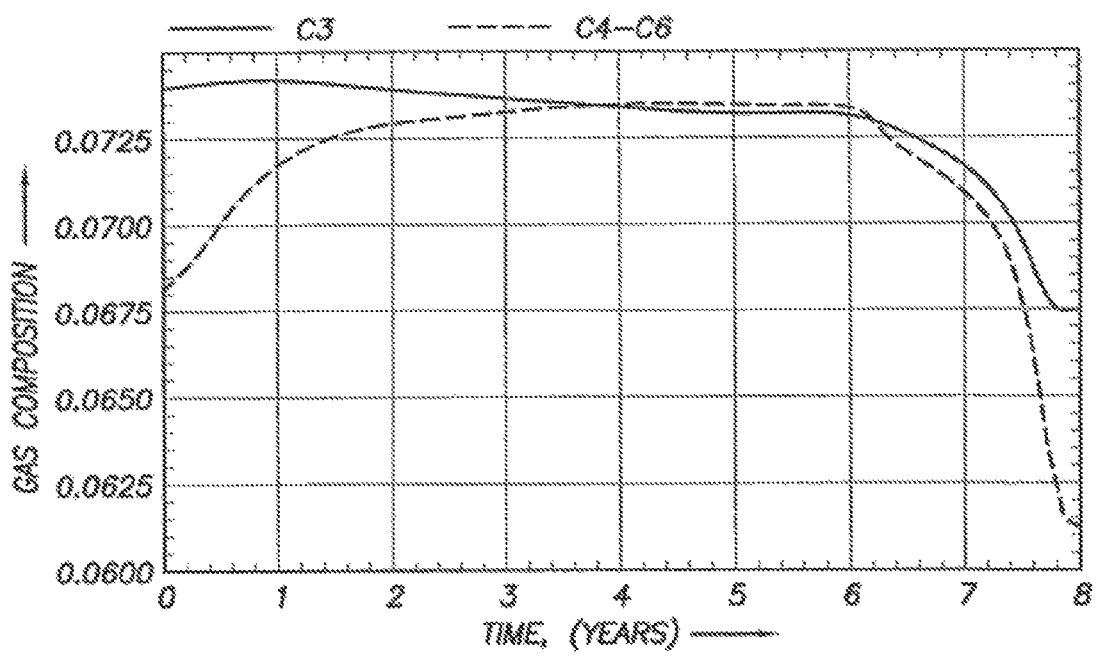

The injected gas composition (from the second stage of GATHER's separator) is shown in FIG. 17. In this figure the methane, propane, and C4-C6 mole fraction vs. time are shown. The methane fraction decreases slightly in the first year, stabilizes for the following five years and then increases sharply thereafter.

Conclusions

A controller has been constructed that couples multiple reservoir simulation models and surface network models. Each model is ran as a separate executable and they communicate through an open passing interface. This method allows flexibility in the choice of reservoir and network simulation software.

A 'tight' iteratively lagged coupling scheme is suitable in cases where a surface network is coupled to a single reservoir model. The network/reservoir system is balanced in the first few Newton iterations of each reservoir time step.

When two or more reservoirs are coupled, a 'loose' coupling scheme is employed in which the reservoirs (and the network, if present) are balanced with respect to their global constraints at the start of each 'synchronization step' in the controller. Thereafter, each reservoir model is allowed to advance independently to the start of the next synchronization step.

Each reservoir and network simulation may, if required, have different fluid models, allowing a mixture of black oil and compositional models with different numbers of pseudo-components. The controller converts their wellstreams into its own fluid description, which contains the super-set of each model's component or pseudo-component set.

Example applications are described, illustrating how global rate constraints and a common production network can influence the coupled reservoirs. The second example also illustrates the conversion of black oil and compositional wellstreams into the controller's fluid model.

Nomenclature
m=mass
M=molar weight
p=pressure
PI=productivity index
q=volumetric rate
Q=dissolved gas concentration
$R_s$=split parameter
S=liquid composition
x=liquid composition
y=vapor composition
z=feed composition
Subscripts
i,j=components
m=mass
s=surface
v=volume
Superscripts
d=delumped
g=gas
l=lumped
L=liquid
o=oil
V=vapor ECLIPSE is a registered trademark of Schlumberger Technology Corporation.

REFERENCES

1. Lobato-Barradas, G., Dutta-Roy, K., Moreno-Rosas, A. and Ozen C.: "Integrated Compositional Surface-Subsurface Modeling for Rate Allocation Calculations," paper SPE 74382 presented at the SPE International Petroleum Conference and Exhibition in Mexico, Villahermosa, Mexico, 10-12 Feb. 2002.
2. Liao, T.T. and Stein, M.H.: "Evaluating Operation Strategies via Integrated Asset Modeling," paper SPE 75525 presented at the SPE Gas Technology Symposium, Calgary, Alberta, Canada, 30 Apr.-2 May 2002.
3. Marsh, J. and Kenny, J.: "Wildcat Hills Gas Gathering System Case Studies: An Integrated Approach From Reservoir Development Through to Sales Pipeline Delivery," paper SPE 7:698 presented at the SPE Gas Technology Symposium, Calgary, Alberta, Canada 30 Apr.-2 May 2002.
4. Beliakova, N., van Berkel, J. T., Kulawski, G. J., Schulte, A. M. and Weisenborn, A. J.: "Hydrocarbon Field Planning Tool for Medium to Long Term Production Forecasting from Oil and Gas Fields Using Integrated Surface-Subsurface Models," paper SPE 65160 presented at the SPE European Petroleum Conference, Paris, France, 24-25 Oct. 2000.
5. Weisenborn, A. J. and Schulte, A. M.: "Compositional Integrated Subsurface-Surface Modeling," paper SPE 65158 presented at the SPE European Petroleum Conference, Paris,-France, 24-25 Oct. 2000.
6. Zapata, V. J., Brummett, W. M., Osborne, M. E. and Van Nispen, D. J.: "Advances in Tightly Coupled Reservoir/ Wellbore/Surface-Network Simulation," SPEREE (April 2001) 114.
7. Tingas, J, Frimpong, R and Liou, J.: "Integrated Reservoir and Surface Network Simulation in Reservoir Management of Southern North Sea Gas Reservoirs," paper SPE 50635 presented at the 1998 SPE European Petroleum Conference, The Hague, The Netherlands, 20-22 Oct. 1998.
8. Deutman, R. and van Rijen, M.: "A Case Study of Integrated Gas Field System Modelling in the North Sea Environment," paper SPE 38556 presented at the 1997 Offshore Europe Conference, Aberdeen, Scotland, 9-12 Sep. 1997.
9. Litvak, M. L. and Darlow, B. L.: "Surface Network and Well Tubinghead Pressure Constraints in Compositional Simulation," paper SPE 29125 presented at the 13th SPE Symposium on Reservoir Simulation, San Antonio, Tex., 12-15 Feb. 1995.
10. Litvak, M. L. and Wang, C. H.: "Simplified Phase-Equilibrium Calculations in Integrated Reservoir and Surface-Pipeline-Network Models," SPEJ (June 2000) 236.
11. Haugen, E. D., Holmes, J. A. and Selvig, A.: "Simulation of Independent Reservoirs Coupled by Global Production and Injection Constraints," paper SPE 29106 presented at the 13th SPE Symposium on Reservoir Simulation, San Antonio, Tex., 12-15 Feb. 1995.
12. Barroux, C. C., Duchet-Suchaux, P., Samier, P. and Nabil, R.: "Linking Reservoir and Surface Simulators: How to Improve the Coupled Solutions," paper SPE 65159 presented at the SPE European Petroleum Conference, Paris, France, 24-25 Oct. 2000.
13. Pieters, J. and Por, J. A. G.: "Total System Modelling—a Tool for Effective Reservoir Management of Multiple Fields with Shared Facilities," paper SPE 30442 presented at the Offshore Europe Conference, Aberdeen, 5-8 Sep. 1995.
14. Trick, M. D.: "A different Approach to Coupling a Reservoir Simulator with a Surface Facilities Model," paper 40001 presented at the SPE Gas Technology Symposium, Calgary, Alberta, Canada, 15-18 Mar. 1998.
15. Hepguler, F., Barua, S. and Bard, W.: "Integration of a Field Surface and Production Network with a Reservoir Simulator", SPE 38937, SPE Computer Applications (June 1997) 88-93.

What is claimed is:
1. A computer-executable method of coupling multiple independent reservoir and network simulators with a physical controller comprising: providing an open message-passing interface that communicates with black oil model reservoir simulators, compositional model reservoir simulators, and different types of surface network simulators; initiating a first reservoir simulation on a first simulator for a first set of one or more physical parameters of a first reservoir, the first reservoir simulation using a first fluid model, the first reservoir simulator using a first set of components for a compositional reservoir model; initiating a second reservoir simulation on a second simulator for a second set of one or more physical parameters of a second reservoir, the second reservoir simulation using a second fluid model; initiating a network simu- lation on a network simulator to model a network for coupling the first reservoir and the second reservoir to a surface facility, the network simulator using a second set of components for a compositional network model; selecting maximum synchronization intervals to limit controller time steps; defining network balancing times based on the controller time steps; applying the controller time steps via the open message-passing interface to the advancement through time of the first reservoir simulator, the second reservoir simulator, and the network simulator, each controller time step enabling the first reservoir simulator, the second reservoir simulator, and the network simulator to each take an independent number of non-identical time steps to advance to the start of a next controller time step; varying the duration of the controller time steps in response to a production rate or an injection rate of the first reservoir simulator or the second reservoir simulator; translating via the open message-passing interface each of a first hydrocarbon fluid stream of the first reservoir simulator and a second hydrocarbon fluid stream of the second reservoir simulator to a common fluid model, wherein the translating comprises: selecting a super-set of components for the controller, the super-set of components comprising the first set of components and the second set of components, delumping the first set of components from the first reservoir simulation into the super-set of components for the controller, and lumping the super-set of components for the controller into the second set of components for the network simulation; and initiating network balancing among the simulators at a corresponding point in each controller time step.

2. A controller for coupling multiple independent reservoir and network simulators comprising:
    means for interfacing via open message-passing with different types of simulation tasks each using an independent simulator including black oil model reservoir simulations, compositional model reservoir simulations, and different types of surface network simulations;
    means for initiating a first reservoir simulation on a first simulator using a first simulation model for a first set of one or more physical parameters of a first reservoir, the first reservoir simulation using a first fluid model, the first reservoir simulator using a first set of components for a compositional reservoir model;
    means for initiating a second reservoir simulation on a second simulator using a second simulation model for a second set of one or more physical parameters of a second reservoir, the second reservoir simulation using a second fluid model;
    means for initiating a network simulation on a third simulator using a third simulation model to model a network for coupling the first reservoir and the second reservoir to a surface facility, the network simulator using a second set of components for a compositional network model;
    means for selecting a maximum synchronization time to define controller time steps and network balancing times based on the controller time steps, the controller time steps being independent of the respective time steps of the independent simulation models;
    means for applying the controller time steps to the advancement through time of the first reservoir simulation, the second reservoir simulation, and the network simulation, each controller time step enabling the first reservoir simulation, the second reservoir simulation, and the network simulation to each take an independent number of non-identical time steps to advance to the start of a next controller time step;
    means for dynamically adjusting the duration of the controller time steps when a production or injection rate in one of the simulations changes beyond a selected threshold;
    means for translating each of a first hydrocarbon fluid stream of the first reservoir simulation and a second hydrocarbon fluid stream of the second reservoir simulation to a common fluid model of the controller, wherein the translating comprises:
        selecting a super-set of components for the controller, the super-set of components comprising the first set of components and the second set of components,
        delumping the first set of components from the first reservoir simulation into the super-set of components for the controller, and
        lumping the super-set of components for the controller into the second set of components for the network simulation;
    means for network balancing at a corresponding point in each of the controller time steps.

3. The controller of claim 2 additionally comprising means for balancing the coupled reservoir simulations, including means for apportioning global production and injection rates between the simulation tasks of the first reservoir simulation and the second reservoir simulation.

4. The controller of claim 3 additionally comprising means for balancing the coupled reservoir simulations and the surface network, including means for balancing the surface network with the global production and injection rates apportioned between the simulation tasks of the first reservoir simulation and the second reservoir simulation.

5. The controller of claim 2, wherein the means for initiating the first reservoir simulation initiates a first reservoir simulation that comprises a black oil model and the means for initiating the second reservoir simulation initiates a second reservoir simulation that comprises a compositional model.

6. The controller of claim 2, further comprising means for coupling additional reservoir simulations in addition to the first reservoir simulation and the second reservoir simulation, wherein the additional reservoir simulations run a mixture of black oil models with different sets of active phases and compositional models with different sets of pseudo-components.

7. The controller of claim 2, wherein the first reservoir simulation, the second reservoir simulation, and the network simulation run on different computing platforms as slave tasks to the controller.

8. The computer-executable method of claim 1 additionally comprising:
    balancing the coupled reservoir simulations, including apportioning global production and injection rates between the simulation tasks of the first reservoir simulation and the second reservoir simulation.

9. The computer-executable method of claim 1 additionally comprising:
    balancing the coupled reservoir simulations and a surface network, including balancing the surface network with the global production and injection rates apportioned between the simulation tasks of the first reservoir simulation and the second reservoir simulation.

10. The computer-executable method of claim 1, wherein initiating the first reservoir simulation comprises initiating a first reservoir simulation that comprises a black oil model and wherein initiating the second reservoir simulation comprises initiating a second reservoir simulation that comprises a compositional model.

11. The computer-executable method of claim 1, further comprising:
    coupling additional reservoir simulations in addition to the first reservoir simulation and the second reservoir simulation, wherein the additional multi-platform reservoir simulations run a mixture of black oil models with different sets of active phases and compositional models with different sets of pseudo-components.

12. The computer-executable method of claim 1, wherein the first reservoir simulation and the second reservoir simulation are run on different computing platforms as slave processes to a controller process balancing the slave processes and dynamically varying controller time steps of the slave processes.

13. A non-transitory computer readable storage medium containing instructions, which, when executed by a physical controller, perform a process comprising: interfacing via open message-passing with different types of simulation tasks on independent simulators including black oil model reservoir simulations, compositional model reservoir simulations, and different types of surface network simulations; initiating a first reservoir simulation on a first simulator using a first simulation model for a first set of one or more physical parameters of a first reservoir, the first reservoir simulation using a first fluid model, the first reservoir simulator using a first set of components for a compositional reservoir model; initiating a second reservoir simulation on a second simulator using a second simulation model for a second set of one or more physical parameters of a second reservoir, the second reservoir simulation using a second fluid model; initiating a network simulation on a third simulator using a third simulation model to model a network for coupling the first reservoir and the second reservoir to a surface, the network simulator using a second set of components for a compositional network model; selecting a maximum synchronization duration to define controller time steps and network balancing times based on the controller time steps, the time steps independent of the first, second, and third independent simulation models; applying the controller time steps to the advancement through time of the first reservoir simulation and the second reservoir simulation and the network simulation, each controller time step enabling different simulation tasks to each take an independent number of non-identical time steps to advance to a next controller time step; dynamically varying the duration of the controller time steps in response to a production rate or an injection rate of the first reservoir simulation or the second reservoir simulation; and translating each of a first hydrocarbon fluid stream of the first reservoir simulator and a second hydrocarbon fluid stream of the second reservoir simulator to a common fluid model, wherein the translating comprises: selecting a super-set of components for the controller, the super-set of components comprising the first set of components and the second set of components, delumping the first set of components from the first reservoir simulation into the super-set of components for the controller, and lumping the super-set of components for the controller into the second set of components for the network simulation.

14. The computer readable storage medium of claim 13, further comprising instructions for
    balancing the network simulation at corresponding points of each controller time step.

15. The computer readable storage medium of claim 13, further comprising instructions which, when executed by the computer, perform a process comprising:
    balancing the coupled reservoir simulations, including apportioning global production and injection rates between the simulation tasks of the first reservoir simulation and the second reservoir simulation.

16. The computer readable storage medium of claim 13, further comprising instructions which, when executed by the computer, perform a process comprising:
    balancing the coupled reservoir simulations and the surface network simulation, including balancing the surface network simulation with the global production and injection rates apportioned between the simulation tasks of the first reservoir simulation and the second reservoir simulation.

17. The computer readable storage medium of claim 15, wherein initiating the first reservoir simulation comprises:
    initiating a first reservoir simulation that comprises a black oil model and wherein initiating the second reservoir simulation comprises initiating a second reservoir simulation that comprises a compositional model.

18. The computer readable storage medium of claim 15, further comprising instructions which, when executed by the computer, perform a process comprising:
    coupling additional reservoir simulations in addition to the first reservoir simulation and the second reservoir simulation, wherein the additional reservoir simulations run a mixture of black oil models with different sets of active phases and compositional models with different sets of pseudo-components.

19. The computer readable storage medium of claim 15, wherein the first reservoir simulation and the second reservoir simulation run on different computing platforms as slave processes to a master controlling process.

* * * * *